United States Patent
Lert, Jr.

(10) Patent No.: US 12,319,506 B2
(45) Date of Patent: *Jun. 3, 2025

(54) AUTOMATED-SERVICE RETAIL SYSTEM AND METHOD

(71) Applicant: Symbotic LLC, Wilmington, MA (US)

(72) Inventor: John G. Lert, Jr., Wakefield, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,268

(22) Filed: Mar. 4, 2024

(65) Prior Publication Data
US 2024/0199334 A1   Jun. 20, 2024

Related U.S. Application Data

(63) Continuation of application No. 17/499,783, filed on Oct. 12, 2021, now Pat. No. 11,952,215, which is a
(Continued)

(51) Int. Cl.
*B65G 1/137*   (2006.01)
*B65G 1/04*    (2006.01)
(Continued)

(52) U.S. Cl.
CPC ......... *B65G 1/1373* (2013.01); *B65G 1/0492* (2013.01); *B65G 1/137* (2013.01);
(Continued)

(58) Field of Classification Search
CPC .... B65G 1/1373; B65G 1/0492; B65G 1/137; B66F 9/063; G05B 19/41815;
(Continued)

(56) References Cited

U.S. PATENT DOCUMENTS

| | | | |
|---|---|---|---|
| 1,242,872 A | 10/1917 | Saunders | |
| 3,927,773 A | 12/1975 | Bright | |

(Continued)

FOREIGN PATENT DOCUMENTS

| | | |
|---|---|---|
| CN | 101790740 | 7/2010 |
| DE | 3624033 | 8/1987 |

(Continued)

OTHER PUBLICATIONS

Bill Bishop, "The Automated Supermarket: Part 1", www.brickmeetsclick.com, Jul. 23, 2013.
(Continued)

*Primary Examiner* — Thomas Randazzo
(74) *Attorney, Agent, or Firm* — Perman & Green, LLP

(57) ABSTRACT

A combination automated-service and self-service store for implementation at brick-and-mortar retail locations is provided. The store and corresponding method of implementation is an automated-service model in which robots, deployed at the brick-and-mortar location, fill orders for fungible goods placed by customers either online or in-store. The store also includes a shopping section where customers can select/order items and/or personally select non-fungible goods. The store includes a shopping section for non-fungible goods that customers prefer to pick out by hand and a back end automated order fulfillment section for other goods (e.g., fungible goods, dry goods, etc.). The two sets of goods are merged to a delivery bundle and delivered together for pickup by the customer. The combination automated-service and self-service store combines the convenience of online shopping and self-service shopping using an unconventional approach that reduces costs for the retailer and simultaneously increases customer satisfaction.

18 Claims, 16 Drawing Sheets

Related U.S. Application Data continuation of application No. 15/816,832, filed on Nov. 17, 2017, now Pat. No. 11,142,402.

(60) Provisional application No. 62/423,614, filed on Nov. 17, 2016.

(51) Int. Cl.
| | | |
|---|---|---|
| *B66F 9/06* | (2006.01) | |
| *G05B 19/418* | (2006.01) | |
| *G06K 7/14* | (2006.01) | |
| *G06Q 10/08* | (2024.01) | |
| *G06Q 10/087* | (2023.01) | |
| *G06Q 20/12* | (2012.01) | |
| *G06Q 30/06* | (2023.01) | |
| *G06Q 30/0601* | (2023.01) | |

(52) U.S. Cl.
CPC ........ *B66F 9/063* (2013.01); *G05B 19/41895* (2013.01); *G06Q 10/087* (2013.01); *G06Q 20/12* (2013.01); *G06Q 30/06* (2013.01); *G06Q 30/0617* (2013.01); *G06Q 30/0633* (2013.01); *G06Q 30/0635* (2013.01); *G06Q 30/0641* (2013.01); *G06Q 30/0643* (2013.01); *G06K 7/1413* (2013.01)

(58) Field of Classification Search
CPC ........... G05B 19/41895; G06Q 10/087; G06Q 20/12; G06Q 30/06; G06Q 30/0617; G06Q 30/0633; G06Q 30/0635; G06Q 30/0641; G06Q 30/0643; G06K 7/1413
See application file for complete search history.

(56) References Cited

U.S. PATENT DOCUMENTS

| | | | |
|---|---|---|---|
| 4,007,843 A | 2/1977 | Lubbers | |
| 4,221,076 A | 9/1980 | Ozawa | |
| 4,415,975 A | 11/1983 | Burt | |
| 4,428,708 A | 1/1984 | Burt | |
| 5,143,246 A | 9/1992 | Johnson | |
| 5,179,329 A | 1/1993 | Nishikawa | |
| 5,186,281 A | 2/1993 | Jenkins | |
| 5,433,293 A | 7/1995 | Sager | |
| 5,472,309 A | 12/1995 | Bernard, II | |
| 5,501,295 A | 3/1996 | Muller | |
| 5,526,940 A | 6/1996 | Shea | |
| 5,551,823 A | 9/1996 | Maruyama | |
| 5,595,264 A * | 1/1997 | Trotta, Jr. .................. | G07F 7/00 235/383 |
| 5,636,966 A | 6/1997 | Lyon | |
| 5,642,976 A | 7/1997 | Konstant | |
| 5,890,136 A | 3/1999 | Kipp | |
| 5,953,234 A | 9/1999 | Singer | |
| 5,996,316 A | 12/1999 | Kirschner | |
| 6,026,376 A * | 2/2000 | Kenney .............. | G06Q 30/0623 705/26.61 |
| 6,289,260 B1 | 9/2001 | Bradley | |
| 6,325,586 B1 | 12/2001 | Loy | |
| 6,386,448 B1 | 5/2002 | Addy | |
| 6,494,313 B1 | 12/2002 | Trescott | |
| 6,539,876 B1 | 4/2003 | Campbell | |
| 6,671,580 B2 | 12/2003 | Campbell | |
| 6,729,836 B2 | 5/2004 | Stingel, III | |
| 6,744,436 B1 | 6/2004 | Anthony | |
| 6,805,526 B2 | 10/2004 | Stefani | |
| 6,895,301 B2 | 5/2005 | Mountz | |
| 7,054,832 B1 * | 5/2006 | Vallabh .............. | G06Q 30/0633 705/26.8 |
| 7,101,139 B1 | 9/2006 | Benedict | |
| 7,110,855 B2 | 9/2006 | Leishman | |
| 7,139,637 B1 | 11/2006 | Waddington | |
| 7,246,706 B1 | 7/2007 | Shakes | |
| 7,255,525 B2 | 8/2007 | Smith | |
| 7,381,022 B1 | 6/2008 | King | |
| 7,532,947 B2 | 5/2009 | Waddington | |
| 7,591,630 B2 | 9/2009 | Lert, Jr. | |
| 7,603,299 B1 | 10/2009 | Dewey, Jr. | |
| 7,640,863 B2 | 1/2010 | Minges | |
| 7,751,928 B1 | 7/2010 | Antony | |
| 7,774,234 B1 * | 8/2010 | Kopelman .............. | G06Q 40/04 705/37 |
| 7,861,844 B2 | 1/2011 | Hayduchok | |
| 7,894,932 B2 | 2/2011 | Mountz | |
| 7,894,933 B2 | 2/2011 | Mountz | |
| 7,896,243 B2 | 3/2011 | Herskovitz | |
| 7,931,431 B2 | 4/2011 | Benedict | |
| 7,938,324 B2 | 5/2011 | Tamarkin | |
| 7,991,505 B2 | 8/2011 | Lert, Jr. | |
| 8,104,601 B2 | 1/2012 | Hayduchok | |
| 8,201,737 B1 | 6/2012 | Palacios Durazo | |
| 8,276,740 B2 | 10/2012 | Hayduchok | |
| 8,311,902 B2 | 11/2012 | Mountz | |
| 8,327,609 B2 | 12/2012 | Krizmanic | |
| 8,425,173 B2 | 4/2013 | Lert | |
| 8,447,665 B1 | 5/2013 | Schoenharl | |
| 8,483,869 B2 | 7/2013 | Wurman | |
| 8,527,325 B1 | 9/2013 | Atreya | |
| 8,579,574 B2 | 11/2013 | Joachim | |
| 8,594,835 B2 | 11/2013 | Lert | |
| 8,622,194 B2 | 1/2014 | Dewitt | |
| 8,626,335 B2 | 1/2014 | Wurman | |
| 8,639,531 B2 | 1/2014 | Hasan | |
| 8,690,510 B1 | 4/2014 | Razumov | |
| 8,694,152 B2 | 4/2014 | Cyrulik | |
| 8,718,814 B1 | 5/2014 | Clark | |
| 8,721,250 B2 | 5/2014 | Razumov | |
| 8,721,251 B1 | 5/2014 | Razumov | |
| 8,734,079 B1 | 5/2014 | Razumov | |
| 8,738,177 B2 | 5/2014 | Van Ooyen | |
| 8,740,538 B2 | 6/2014 | Lert | |
| 8,831,984 B2 | 9/2014 | Hoffman | |
| 8,892,240 B1 | 11/2014 | Vliet | |
| 8,965,562 B1 | 2/2015 | Wurman | |
| 8,972,045 B1 | 3/2015 | Mountz | |
| 8,983,647 B1 | 3/2015 | Dwarakanath | |
| 9,008,828 B2 | 4/2015 | Worsley | |
| 9,008,829 B2 | 4/2015 | Worsley | |
| 9,008,830 B2 | 4/2015 | Worsley | |
| 9,010,517 B2 | 4/2015 | Hayduchok | |
| 9,020,632 B2 | 4/2015 | Naylor | |
| 9,037,286 B2 | 5/2015 | Lert | |
| 9,051,120 B2 | 6/2015 | Lert | |
| 9,096,375 B2 | 8/2015 | Lert | |
| 9,111,251 B1 | 8/2015 | Brazeau | |
| 9,120,622 B1 | 9/2015 | Elazary | |
| 9,129,250 B1 | 9/2015 | Sestini | |
| 9,139,363 B2 | 9/2015 | Lert | |
| 9,147,208 B1 | 9/2015 | Argue | |
| 9,216,857 B1 | 12/2015 | Kalyan | |
| 9,242,798 B2 | 1/2016 | Guan | |
| 9,242,799 B1 | 1/2016 | James | |
| 9,260,245 B2 | 2/2016 | Este | |
| 9,321,591 B2 | 4/2016 | Lert | |
| 9,330,373 B2 | 5/2016 | Mountz | |
| 9,334,113 B2 | 5/2016 | Naylor | |
| 9,334,116 B2 | 5/2016 | Dewitt | |
| 9,378,482 B1 | 6/2016 | Pikler | |
| 9,409,664 B1 | 8/2016 | Vliet | |
| 9,423,796 B2 | 8/2016 | Sullivan | |
| 9,428,295 B2 | 8/2016 | Vliet | |
| 9,452,883 B1 | 9/2016 | Wurman | |
| 9,466,045 B1 | 10/2016 | Kumar | |
| 9,487,356 B1 | 11/2016 | Aggarwal | |
| 9,505,556 B2 | 11/2016 | Razumov | |
| 9,527,669 B1 | 12/2016 | Hanssen | |
| 9,550,624 B2 * | 1/2017 | Khodl .................. | G06Q 50/40 |
| 9,558,472 B1 | 1/2017 | Tubilla Kuri | |
| 9,626,709 B2 | 4/2017 | Koch | |
| 9,630,777 B2 | 4/2017 | Yamashita | |
| 9,733,646 B1 | 8/2017 | Nusser | |
| 9,751,693 B1 | 9/2017 | Battles | |

(56) References Cited

U.S. PATENT DOCUMENTS

| | | | |
|---|---|---|---|
| 9,815,625 B2 | 11/2017 | Dewitt | |
| 9,821,959 B2 | 11/2017 | Hognaland | |
| 9,827,683 B1 | 11/2017 | Hance | |
| 9,852,396 B2 | 12/2017 | Jones | |
| 9,978,036 B1 | 5/2018 | Eller | |
| 10,127,514 B2 | 11/2018 | Napoli | |
| 10,179,700 B2 | 1/2019 | Lert, Jr. | |
| 10,189,641 B2 | 1/2019 | Hognaland | |
| 10,192,195 B1 | 1/2019 | Brazeau | |
| 10,229,385 B2 | 3/2019 | Evers | |
| 10,336,543 B1 | 7/2019 | Sills | |
| 10,360,531 B1 | 7/2019 | Stallman | |
| 10,435,241 B2 | 10/2019 | Lert | |
| 10,482,421 B1 | 11/2019 | Ducrou | |
| 10,579,965 B2 | 3/2020 | Meurer | |
| 11,142,402 B2* | 10/2021 | Lert, Jr. | G06Q 30/0643 |
| 11,952,215 B2 | 4/2024 | Lert, Jr. | |
| 2002/0059121 A1 | 5/2002 | Schneider | |
| 2002/0077937 A1 | 6/2002 | Lyons | |
| 2002/0082887 A1 | 6/2002 | Boyert | |
| 2002/0133415 A1 | 9/2002 | Zarovinsky | |
| 2002/0143669 A1 | 10/2002 | Scheer | |
| 2003/0110104 A1 | 6/2003 | King | |
| 2003/0197061 A1 | 10/2003 | Din | |
| 2004/0010337 A1 | 1/2004 | Mountz | |
| 2004/0010339 A1 | 1/2004 | Mountz | |
| 2004/0024730 A1 | 2/2004 | Brown | |
| 2004/0111337 A1 | 6/2004 | Feeney | |
| 2004/0238629 A1 | 12/2004 | Buchholz | |
| 2004/0249497 A1 | 12/2004 | Saigh | |
| 2004/0254825 A1 | 12/2004 | Hsu | |
| 2005/0035694 A1 | 2/2005 | Stevens | |
| 2005/0043850 A1 | 2/2005 | Stevens | |
| 2005/0047895 A1 | 3/2005 | Lert | |
| 2005/0060246 A1 | 3/2005 | Lastinger | |
| 2005/0096936 A1 | 5/2005 | Lambers | |
| 2005/0108114 A1 | 5/2005 | Kaled | |
| 2005/0149226 A1 | 7/2005 | Stevens | |
| 2005/0182695 A1 | 8/2005 | Lubow | |
| 2005/0256787 A1 | 11/2005 | Wadawadigi | |
| 2005/0267791 A1 | 12/2005 | LaVoie | |
| 2005/0278062 A1 | 12/2005 | Janert | |
| 2006/0020366 A1 | 1/2006 | Bloom | |
| 2006/0108419 A1 | 5/2006 | Som | |
| 2006/0182548 A1* | 8/2006 | Gretsch | B65H 19/126 414/273 |
| 2006/0257236 A1 | 11/2006 | Stingel, III | |
| 2007/0011053 A1 | 1/2007 | Yap | |
| 2007/0016496 A1 | 1/2007 | Bar | |
| 2007/0127691 A1 | 6/2007 | Lert | |
| 2007/0162353 A1 | 7/2007 | Borders | |
| 2007/0210164 A1 | 9/2007 | Conlon | |
| 2007/0244758 A1 | 10/2007 | Xie | |
| 2007/0276535 A1 | 11/2007 | Haag | |
| 2007/0293978 A1 | 12/2007 | Wurman | |
| 2007/0294029 A1 | 12/2007 | Raffaello | |
| 2008/0040244 A1 | 2/2008 | Ricciuti | |
| 2008/0041947 A1 | 2/2008 | Hollister | |
| 2008/0131241 A1 | 6/2008 | King | |
| 2008/0131255 A1 | 6/2008 | Hessler | |
| 2008/0181753 A1 | 7/2008 | Bastian | |
| 2008/0215180 A1 | 9/2008 | Kota | |
| 2009/0074545 A1 | 3/2009 | Lert | |
| 2009/0149985 A1 | 6/2009 | Chirnomas | |
| 2009/0157472 A1 | 6/2009 | Burazin | |
| 2009/0249749 A1 | 10/2009 | Schill | |
| 2009/0272799 A1 | 11/2009 | Skor | |
| 2009/0276264 A1 | 11/2009 | Pandit | |
| 2010/0010902 A1 | 1/2010 | Casey | |
| 2010/0060455 A1 | 3/2010 | Frabasile | |
| 2010/0076591 A1 | 3/2010 | Lert, Jr. | |
| 2010/0114790 A1 | 5/2010 | Strimling | |
| 2010/0234980 A1 | 9/2010 | Lapre | |
| 2010/0262278 A1 | 10/2010 | Winkler | |
| 2010/0310344 A1* | 12/2010 | Hinnen | G06Q 10/087 414/273 |
| 2010/0316468 A1 | 12/2010 | Lert | |
| 2010/0316469 A1 | 12/2010 | Lert | |
| 2010/0316470 A1 | 12/2010 | Lert | |
| 2010/0322746 A1 | 12/2010 | Lert | |
| 2010/0322747 A1 | 12/2010 | Lert | |
| 2011/0008138 A1 | 1/2011 | Yamashita | |
| 2011/0238207 A1 | 9/2011 | Bastian, II | |
| 2011/0243707 A1 | 10/2011 | Dumas | |
| 2011/0320034 A1 | 12/2011 | Dearlove | |
| 2012/0029683 A1 | 2/2012 | Keller | |
| 2012/0029685 A1* | 2/2012 | Keller | B65G 1/1373 700/216 |
| 2012/0101627 A1 | 4/2012 | Lert | |
| 2012/0143427 A1 | 6/2012 | Hoffman | |
| 2012/0150340 A1 | 6/2012 | Suess | |
| 2012/0173351 A1* | 7/2012 | Hanson | G06Q 30/0635 705/26.81 |
| 2012/0186942 A1 | 7/2012 | Toebes | |
| 2012/0195720 A1 | 8/2012 | Sullivan | |
| 2012/0219397 A1 | 8/2012 | Baker | |
| 2012/0298688 A1 | 11/2012 | Stiernagle | |
| 2012/0330458 A1 | 12/2012 | Weiss | |
| 2013/0087610 A1 | 4/2013 | Shin | |
| 2013/0181586 A1 | 7/2013 | Hognaland | |
| 2013/0226718 A1* | 8/2013 | Ascarrunz | G06Q 30/00 705/17 |
| 2013/0235206 A1 | 9/2013 | Smith | |
| 2013/0246229 A1 | 9/2013 | Mountz | |
| 2013/0310967 A1 | 11/2013 | Olson | |
| 2013/0317642 A1 | 11/2013 | Asaria | |
| 2013/0346204 A1 | 12/2013 | Wissner-Gross | |
| 2014/0003727 A1 | 1/2014 | Lortz | |
| 2014/0040075 A1 | 2/2014 | Perry | |
| 2014/0052498 A1* | 2/2014 | Marshall | G07F 9/0235 700/218 |
| 2014/0058822 A1 | 2/2014 | Sobecks | |
| 2014/0062699 A1 | 3/2014 | Heine | |
| 2014/0088758 A1 | 3/2014 | Lert | |
| 2014/0100769 A1 | 4/2014 | Wurman | |
| 2014/0100999 A1 | 4/2014 | Mountz | |
| 2014/0136218 A1 | 5/2014 | Bolene | |
| 2014/0143099 A1 | 5/2014 | Wilkins | |
| 2014/0156553 A1 | 6/2014 | Leach | |
| 2014/0212249 A1 | 7/2014 | Kawano | |
| 2014/0244026 A1 | 8/2014 | Neiser | |
| 2014/0257555 A1 | 9/2014 | Bastian, II | |
| 2014/0271063 A1 | 9/2014 | Lert | |
| 2014/0279294 A1 | 9/2014 | Field-Darragh | |
| 2014/0288696 A1 | 9/2014 | Lert | |
| 2014/0308098 A1 | 10/2014 | Lert | |
| 2014/0324491 A1 | 10/2014 | Banks | |
| 2014/0330603 A1 | 11/2014 | Corder | |
| 2014/0336814 A1 | 11/2014 | Moore | |
| 2014/0343717 A1 | 11/2014 | Dorval | |
| 2014/0350715 A1 | 11/2014 | Gopalakrishnan | |
| 2014/0351101 A1 | 11/2014 | Danelski | |
| 2014/0365341 A1* | 12/2014 | MacLaurin | G06Q 20/3276 705/26.81 |
| 2015/0032252 A1 | 1/2015 | Galluzzo | |
| 2015/0051994 A1 | 2/2015 | Ward | |
| 2015/0058178 A1 | 2/2015 | Chirnomas | |
| 2015/0071743 A1 | 3/2015 | Lert, Jr. | |
| 2015/0112826 A1 | 4/2015 | Crutchfield, Jr. | |
| 2015/0134490 A1 | 5/2015 | Collin | |
| 2015/0154535 A1 | 6/2015 | Wappler | |
| 2015/0170256 A1 | 6/2015 | Pettyjohn | |
| 2015/0178671 A1 | 6/2015 | Jones | |
| 2015/0178673 A1 | 6/2015 | Penneman | |
| 2015/0206224 A1* | 7/2015 | Ouimet | G06Q 30/0251 705/26.7 |
| 2015/0220896 A1* | 8/2015 | Carr | G06Q 20/12 705/39 |
| 2015/0266672 A1 | 9/2015 | Lert | |
| 2015/0286967 A1 | 10/2015 | Lert | |
| 2015/0291357 A1 | 10/2015 | Razumov | |
| 2015/0294333 A1 | 10/2015 | Avegliano | |

(56) References Cited

U.S. PATENT DOCUMENTS

| | | |
|---|---|---|
| 2015/0307279 A1 | 10/2015 | Almada |
| 2015/0310447 A1 | 10/2015 | Shaw |
| 2015/0375938 A9 | 12/2015 | Lert |
| 2016/0016733 A1 | 1/2016 | Lert |
| 2016/0031644 A1 | 2/2016 | Schubilske |
| 2016/0055452 A1 | 2/2016 | Qin |
| 2016/0063604 A1* | 3/2016 | Shaffer .............. G06Q 30/0261 705/26.81 |
| 2016/0075512 A1 | 3/2016 | Lert, Jr. |
| 2016/0086255 A1 | 3/2016 | Sainfort |
| 2016/0101940 A1 | 4/2016 | Grinnell |
| 2016/0107838 A1* | 4/2016 | Swinkels .............. B65G 1/1373 414/273 |
| 2016/0110702 A1* | 4/2016 | Landers, Jr. .............. G06F 18/22 705/17 |
| 2016/0129592 A1 | 5/2016 | Saboo |
| 2016/0140488 A1* | 5/2016 | Lindbo ................ B65G 1/1373 705/28 |
| 2016/0145045 A1 | 5/2016 | Mountz |
| 2016/0167227 A1 | 6/2016 | Wellman |
| 2016/0171592 A1* | 6/2016 | Pugh ...................... G06F 16/24 705/26.81 |
| 2016/0223339 A1 | 8/2016 | Pellow |
| 2016/0236867 A1 | 8/2016 | Brazeau |
| 2016/0244262 A1 | 8/2016 | O'Brien |
| 2016/0253740 A1 | 9/2016 | Goulart |
| 2016/0260158 A1* | 9/2016 | High ...................... B62B 5/0069 |
| 2016/0299782 A1 | 10/2016 | Jones |
| 2016/0304281 A1 | 10/2016 | Elazary |
| 2016/0307153 A1 | 10/2016 | Løken |
| 2016/0311617 A1 | 10/2016 | Van Den Berk |
| 2016/0314431 A1* | 10/2016 | Quezada .............. G06Q 10/087 |
| 2016/0325933 A1 | 11/2016 | Stiernagle |
| 2016/0327941 A1 | 11/2016 | Stiernagle |
| 2016/0347545 A1 | 12/2016 | Lindbo |
| 2016/0355337 A1 | 12/2016 | Lert |
| 2016/0364786 A1* | 12/2016 | Wankhede .......... G07G 1/0036 |
| 2016/0371650 A1 | 12/2016 | Schmidt |
| 2017/0036798 A1 | 2/2017 | Prahlad |
| 2017/0043953 A1 | 2/2017 | Battles |
| 2017/0066592 A1 | 3/2017 | Bastian, II |
| 2017/0068973 A1 | 3/2017 | Sinkel |
| 2017/0088360 A1 | 3/2017 | Brazeau |
| 2017/0113910 A1 | 4/2017 | Becchi |
| 2017/0132559 A1 | 5/2017 | Jones |
| 2017/0137222 A1 | 5/2017 | Lert, Jr. |
| 2017/0137223 A1 | 5/2017 | Lert, Jr. |
| 2017/0158430 A1 | 6/2017 | Raizer |
| 2017/0166356 A1 | 6/2017 | Tubilla Kuri |
| 2017/0166399 A1 | 6/2017 | Stubbs |
| 2017/0185933 A1 | 6/2017 | Adulyasak |
| 2017/0185955 A1 | 6/2017 | Hufschmid |
| 2017/0200108 A1 | 7/2017 | Au |
| 2017/0206480 A1 | 7/2017 | Naumann |
| 2017/0213186 A1 | 7/2017 | Grifoni |
| 2017/0220995 A1 | 8/2017 | Paulweber |
| 2017/0228701 A1 | 8/2017 | Wosk |
| 2017/0260008 A1 | 9/2017 | Dewitt |
| 2017/0267452 A1 | 9/2017 | Goren |
| 2017/0269607 A1 | 9/2017 | Fulop |
| 2017/0278047 A1 | 9/2017 | Welty |
| 2017/0285648 A1 | 10/2017 | Welty |
| 2017/0297820 A1 | 10/2017 | Grinnell |
| 2017/0301004 A1* | 10/2017 | Chirnomas ............ G06Q 20/12 |
| 2017/0313514 A1 | 11/2017 | Lert, Jr. |
| 2017/0316233 A1 | 11/2017 | Kherani |
| 2017/0320102 A1 | 11/2017 | Mcvaugh |
| 2017/0322561 A1 | 11/2017 | Stiernagle |
| 2017/0323250 A1 | 11/2017 | Lindbo |
| 2017/0330142 A1 | 11/2017 | Kanellos |
| 2017/0330270 A1* | 11/2017 | Kanellos ............ G06Q 10/0875 |
| 2017/0334646 A1 | 11/2017 | High |
| 2017/0369244 A1 | 12/2017 | Battles |
| 2018/0005173 A1 | 1/2018 | Elazary |
| 2018/0005174 A1 | 1/2018 | Dixon |
| 2018/0029797 A1 | 2/2018 | Hance |
| 2018/0032949 A1* | 2/2018 | Galluzzo .............. B65G 1/1375 |
| 2018/0068368 A1* | 3/2018 | Mattingly .......... G06Q 30/0623 |
| 2018/0130015 A1 | 5/2018 | Jones |
| 2018/0134492 A1 | 5/2018 | Lert, Jr. |
| 2018/0137452 A1 | 5/2018 | Khatravath |
| 2018/0182054 A1 | 6/2018 | Yao |
| 2018/0211203 A1 | 7/2018 | Greenberg |
| 2018/0237221 A1 | 8/2018 | Lindbo |
| 2018/0237222 A1 | 8/2018 | Issing |
| 2018/0300680 A1 | 10/2018 | Undernehr |
| 2018/0314991 A1 | 11/2018 | Grundberg |
| 2018/0319590 A1 | 11/2018 | Lindbo |
| 2018/0342031 A1 | 11/2018 | Tada |
| 2019/0026770 A1 | 1/2019 | Murugesan |
| 2019/0139637 A1 | 5/2019 | Ceh |
| 2019/0197451 A1 | 6/2019 | Balasingham |
| 2019/0389659 A1 | 12/2019 | Grinnell |
| 2021/0032034 A1 | 2/2021 | Kalouche |
| 2022/0036295 A1 | 2/2022 | Lert, Jr. |
| 2022/0274776 A1 | 9/2022 | Lert, Jr. |

FOREIGN PATENT DOCUMENTS

| | | |
|---|---|---|
| DE | 102012100354 A1 | 7/2013 |
| EP | 0302205 A2 | 2/1989 |
| EP | 1348646 A2 | 10/2003 |
| EP | 2650237 B1 | 11/2014 |
| EP | 2995579 | 3/2016 |
| EP | 2651786 B1 | 5/2016 |
| EP | 2651787 B1 | 5/2016 |
| EP | 3056454 | 8/2016 |
| EP | 3542327 | 9/2019 |
| JP | S4715872 | 6/1972 |
| JP | H0642810 U | 6/1994 |
| JP | H08161612 | 6/1996 |
| JP | H1135107 | 2/1999 |
| JP | 2002160813 | 6/2002 |
| JP | 2004139194 | 5/2004 |
| JP | 2007246226 A | 9/2007 |
| JP | 2009535285 | 10/2009 |
| JP | 2020514203 | 5/2020 |
| JP | 7137562 | 9/2022 |
| JP | 2022171728 | 11/2022 |
| WO | 0068856 A2 | 11/2000 |
| WO | 0169552 | 9/2001 |
| WO | 2005097550 A2 | 10/2005 |
| WO | 2007067868 A2 | 6/2007 |
| WO | 2010100513 A2 | 9/2010 |
| WO | 20100118412 | 10/2010 |
| WO | 2014166640 A2 | 10/2014 |
| WO | 2015005873 A1 | 1/2015 |
| WO | 2016172793 A1 | 11/2016 |
| WO | 2016199033 A1 | 12/2016 |
| WO | 2017064401 A1 | 4/2017 |
| WO | 2018094286 | 5/2018 |

OTHER PUBLICATIONS

Bill Bishop, "The Automated Supermarket: Part 2", www.brickmeetsclick.com, Jul. 29, 2013.

Brittain Ladd, "A Beautiful Way to Save Woolworths", www.linkedin.com/pulse, May 17, 2016.

Notice of Allowance and Fee(s) Due dated Jul. 30, 2021 in U.S. Appl. No. 15/816,832.

Response to Final Office Action filed Mar. 19, 2021 in U.S. Appl. No. 15/816,832.

Response to Office Action filed Aug. 12, 2019 in U.S. Appl. No. 15/816,832.

IMPI; App. No. MX/a/2019/005740; Formal Denial mailed May 24, 2024; (13 pages).

Amendment filed Apr. 8, 2016 in U.S. Appl. No. 14/860,410.

Amendment filed Feb. 27, 2015 in U.S. Appl. No. 14/213,187.

Amendment filed Sep. 11, 2017 in U.S. Appl. No. 15/421,208.

Amendment filed Sep. 27, 2016 in U.S. Appl. No. 14/860,410.

(56) References Cited

OTHER PUBLICATIONS

C. Prasse et al., "How IoT will change the design and operation of logistics systems", 2014 International Conference on the Internet of Things (IOT), Oct. 6-8, 2014, pp. 55-60.
C. Wurll, "Mixed Case Palletizing with Industrial Robots," Proceedings of ISR 2016: 47st International Symposium on Robotics, Munich, Germany, pp. 1-6, Jun. 21-22, 2016.
CIPO; App. No. 3,043,896; Examiner's Report mailed Jan. 19, 2023; (4 pages).
CIPO; App. No. 3,043,896; Office Action and Examination Search Report mailed Jan. 19, 2023; (3 pages).
CNIPA; App. No. 201780083818.6; First Search mailed Aug. 19, 2022; (2 pages).
CNIPA; App. No. 201780083818.6; Office Action mailed Aug. 29, 2022; (29 pages).
English language Abstract for DE3624033 published Aug. 6, 1987.
English language Abstract for WO2014166640 published Oct. 16, 2014.
English language Abstract for WO2017064401 published Apr. 20, 2017.
EPO; App. No. 17817396.9; Communication Pursuant to Article 94(3) EPC dated Jun. 27, 2023; (8 pages).
EPO; App. No. 17817396.9; Communication Pursuant to Article 94(3) EPC mailed Feb. 25, 2021; (7 pages).
EPO; App. No. 17817396.9; Communication Pursuant to Article 94(3) EPC mailed Jun. 27, 2023; (8 pages).
EPO; App. No. 17817396.9; Communication Pursuant to Rules 161(1) and 162 EPC mailed Jul. 5, 2019; (3 pages).
Extended European Search Report dated Mar. 13, 2020 in European Patent Application No. 19217215.3.
Extended European Search Report dated May 12, 2021 in European Patent Application No. 21163777.2.
Final Office Action dated Aug. 7, 2018 in U.S. Appl. No. 15/171,802.
Final Office Action dated Jun. 18, 2020 in U.S. Appl. No. 15/826,045.
Final Office Action dated Mar. 24, 2020 in U.S. Appl. No. 15/591,956.
Final Office Action dated Nov. 1, 2019 in U.S. Appl. No. 15/816,832.
Final Office Action dated Nov. 2, 2018 in U.S. Appl. No. 15/816,832.
Final Office Action dated Oct. 20, 2021 in U.S. Appl. No. 16/594,647.
Harrison et al., "Intelligent distribution and logistics", IEE Proceedings—Intelligent Transport Systems, vol. 153, No. 2, pp. 167-180, Jun. 2006.
IMPI; App. No. MX/a/2019/005740; Office Action dated Aug. 31, 2023; (6 pages).
IMPI; App. No. MX/a/2019/005740; Office Action mailed Jan. 6, 2023; (11 pages).
IMPI; App. No. MX/a/2019/005740; Office Action mailed Dec. 13, 2023; (11 pages).
IMPI; App. No. MX/a/2019/005740; Office Action mailed Mar. 31, 2023; (18 pages).
International Search Report for International Application No. PCT/US2018/19537 dated Apr. 13, 2018.
International Search Report and Written Opinion dated Sep. 4, 2020 in International Patent Application No. PCT/ US2020/033250.
International Search Report and Written Opinion dated Sep. 6, 2017 in International Patent Application No. PCT/US2017/032171.
International Search Report for International Application No. PCT/US2016/035547, dated Oct. 7, 2016.
International Search Report for International Application No. PCT/US2017/062423 dated Feb. 5, 2018.
International Search Report for International Application No. PCT/US2018/013203 dated Apr. 5, 2018.
IPA; App. No. 2017362508; Examination Report mailed Aug. 22, 2022; (6 pages).
IPI; App. No. 201927023909; First Examination Report mailed Jun. 18, 2021; (7 pages).
JPO; App. No. 2019-526569; Decision to Grant mailed Jul. 8, 2022; (2 pages).
JPO; App. No. 2019-526569; Office Action mailed Nov. 25, 2020; (7 pages).
JPO; App. No. 2019-526569; Office Action mailed Aug. 19, 2021; (4 pages).
JPO; App. No. 2022-139699; Office Action mailed Jan. 10, 2024; (15 pages).
Kate Taylor, "Walmart, Lowe's, and Whole Foods are banking on this to compete with Amazon", Business Insider, (Sep. 18, 2016), URL: https://www.businessinsider.nl/retail-companies-invest-in-automation-2016-9/?international=true&r=US, (Jan. 24, 2018), XP055444003.
Leung et al., "Design of a Case-Based Multi-Agent Wave Picking Decision Support System for Handling E-Commerce Shipments", 2016 Portland International Conference on Management of Engineering and Technology (PICMET), Sep. 4-8, 2016, pp. 2248-2256.
N. Viswanadham, "The past, present, and future of supply-chain automation", IEE Robotics & Automation Magazine, vol. 9, No. 2, pp. 48-56, Jun. 2002.
Non-Final Office Action dated Mar. 23, 2021 in U.S. Appl. No. 16/594,647.
Non-Final Rejection Mailed Jan. 12, 2016 in U.S. Appl. No. 14/860,410.
Non-Final Rejection mailed Jul. 20, 2016 in U.S. Appl. No. 14/860,410.
Non-final Rejection mailed Sep. 3, 2014 in U.S. Appl. No. 14/213,187.
Notice of Allowance and Fee(s) Due dated Apr. 1, 2021 in U.S. Appl. No. 15/816,832.
Notice of Allowance and Fee(s) Due dated Aug. 19, 2020 in U.S. Appl. No. 15/867,373.
Notice of Allowance and Fee(s) Due dated Aug. 31, 2018 in U.S. Appl. No. 15/978,423.
Notice of Allowance and Fee(s) Due dated Dec. 8, 2017 in U.S. Appl. No. 15/421,209.
Notice of Allowance and Fee(s) Due dated Feb. 11, 2021 in U.S. Appl. No. 15/903,993.
Notice of Allowance and Fee(s) Due dated Jan. 19, 2018 in U.S. Appl. No. 15/421,239.
Notice of Allowance and Fee(s) Due dated Jun. 9, 2021 in U.S. Appl. No. 15/816,832.
Notice of Allowance and Fee(s) Due dated May 15, 2020 in U.S. Appl. No. 15/903,993.
Notice of Allowance and Fee(s) Due dated Oct. 5, 2017 in U.S. Appl. No. 15/421,239.
Notice of Allowance and Fee(s) Due mailed Jan. 17, 2019 in U.S. Appl. No. 15/421,208.
Notice of Allowance and Fee(s) Due mailed May 20, 2015 in U.S. Appl. No. 14/213,187.
Notice of Allowance and Fee(s) Due mailed Nov. 10, 2016 in U.S. Appl. No. 14/860,410.
Notice of Allowance and Fees Due dated Jan. 16, 2018 in U.S. Appl. No. 15/699,700.
Notice of Allowance and Fees Due dated Jan. 29, 2019 in U.S. Appl. No. 15/171,802.
Notice of Allowance dated Mar. 20, 2019 in U.S. Appl. No. 15/421,208.
Office Action dated Apr. 10, 2017 in U.S. Appl. No. 15/421,208.
Office Action dated Apr. 15, 2019 in U.S. Appl. No. 15/816,832.
Office Action dated Apr. 19, 2023 in U.S. Appl. No. 17/240,777.
Office Action dated Apr. 30, 2020 in U.S. Appl. No. 15/816,832.
Office Action dated Aug. 11, 2020 in Japanese Patent Application No. 2018-515183.
Office Action dated Aug. 20, 2020 in U.S. Appl. No. 16/121,212.
Office Action dated Dec. 24, 2020 in U.S. Appl. No. 16/273,449.
Office Action dated Dec. 24, 2020, with English language translation, in Japanese Patent Application No. 2020-038556.
Office Action dated Dec. 5, 2019 in U.S. Appl. No. 15/867,373.
Office Action dated Dec. 5, 2022 in Japanese Patent Application No. 2021-156451.
Office Action dated Feb. 12, 2018 in U.S. Appl. No. 15/171,802.
Office Action dated Feb. 2, 2023 in U.S. Appl. No. 17/223,714.
Office Action dated Jun. 21, 2019 in U.S. Appl. No. 15/867,373.
Office Action dated Mar. 13, 2023 in U.S. Appl. No. 17/745,627.
Office Action dated Mar. 20, 2020 in U.S. Appl. No. 15/867,373.
Office Action dated May 4, 2018 in U.S. Appl. No. 15/816,832.
Office Action dated Nov. 18, 2019 in U.S. Appl. No. 15/903,993.
Office Action dated Nov. 20, 2019 in U.S. Appl. No. 15/826,045.

(56) References Cited

OTHER PUBLICATIONS

Office Action dated Nov. 25, 2020, with English language translation, in Japanese Patent Application No. 2019-526569.
Office Action dated Oct. 19, 2020 in U.S. Appl. No. 15/816,832.
Office Action dated Sep. 14, 2020 in U.S. Appl. No. 15/591,956.
Office Action dated Sep. 14, 2020 in U.S. Appl. No. 15/903,993.
Office Action dated Sep. 14, 2022 in Japanese Patent Application No. 2019-546194.
PCT; App. No. PCT/US2017/062423; International Search Report and Written Opinion mailed Feb. 5, 2018; (15 pages).
Preliminary Amendment filed Dec. 20, 2019 in U.S. Appl. No. 16/594,647.
Qi Xu, "Improving Responsiveness of Supply Chain through RFID Visibility Technology", 2009 IEEE/Informs International Conference on Service Operations, Logistics and Informatics, Chicago, IL, Jul. 22-24, 2009, pp. 513-517.
Response to Office Action dated May 17, 2021 in U.S. Appl. No. 16/273,449.
Response to Office Action filed Apr. 15, 2020 in U.S. Appl. No. 15/826,045.
Response to Office Action filed Apr. 16, 2020 in U.S. Appl. No. 15/903,993.
Response to Office Action filed Apr. 17, 2020 in European Patent Application No. 18709235.8.
Response to Office Action filed Aug. 24, 2020 in U.S. Appl. No. 15/591,956.
Response to Office Action filed Aug. 2, 2018 in U.S. Appl. No. 15/816,832.
Response to Office Action filed Aug. 24, 2020 in U.S. Appl. No. 15/951,956.
Response to Office Action filed Aug. 31, 2020 in U.S. Appl. No. 15/816,832.
Response to Office Action filed Dec. 18, 2020, with English language translation of claims as amended, in Japanese Patent Application No. 2018-515183.
Response to Office Action filed Jan. 24, 2020 in U.S. Appl. No. 15/591,956.
Response to Office Action filed Jul. 20, 2020 in U.S. Appl. No. 15/867,373.
Response to Office Action filed Mar. 22, 2019 in U.S. Appl. No. 15/816,832.
Response to Office Action filed Mar. 30, 2020 in U.S. Appl. No. 15/816,832.
Response to Office Action filed Mar. 5, 2020 in U.S. Appl. No. 15/867,373.
Response to Office Action filed Mar. 6, 2020 in European Patent Application No. 18702006.0.
Response to Office Action filed May 9, 2018 in U.S. Appl. No. 15/171,802.
Response to Office Action filed Nov. 13, 2018 in U.S. Appl. No. 15/421,208.
Response to Office Action filed Nov. 2, 2020, with English machine translation, in Chinese Patent Application No. 201780042943.2.
Response to Office Action filed Oct. 21, 2019 in U.S. Appl. No. 15/867,373.
Response to Office Action filed Oct. 29, 2019 in U.S. Appl. No. 15/826,045.
Response to Office Action filed Sep. 12, 2018 in U.S. Appl. No. 15/171,802.
Response to Office Action filed Sep. 23, 2019 in European Patent Application No. 16804451.9.
Response to Restriction Requirement filed Nov. 20, 2017 in U.S. Appl. No. 15/171,802.
Restriction Requirement dated Nov. 3, 2017 in U.S. Appl. No. 15/171,802, filed Jun. 2, 2016.
Supplemental Amendment filed Oct. 12, 2017 in U.S. Appl. No. 15/421,208.
Supplemental Response to Office Action dated May 26, 2021 in U.S. Appl. No. 16/273,449.
Taylor, Kate; "Walmart, Lowe's, and Whole Foods are banking on this to compete with Amazon"; https://www.businessinsider.nl/retail-companies-invest-in-automation-2016-9/?international=true&r=US; Sep. 18, 2016; pp. 1-8.
U.S. Appl. No. 15/699,700, filed Sep. 8, 2017.
U.S. Appl. No. 15/826,045, filed Nov. 29, 2017.
U.S. Appl. No. 17/499,783; Non-Final Office Action mailed Apr. 7, 2023; (7 pages).
U.S. Appl. No. 17/499,783; Notice of Allowance and Fees Due (PTOL-85) mailed Aug. 22, 2023; (pp. 1-10).
U.S. Appl. No. 17/499,783; Notice of Allowance and Fees Due (PTOL-85) mailed Dec. 4, 2023; (pp. 1-10).

\* cited by examiner

308

418

AUTOMATED-SERVICE RETAIL SYSTEM AND METHOD

CROSS-REFERENCE TO RELATED APPLICATIONS

The present application is a continuation of U.S. patent application Ser. No. 17/499,783, filed on Oct. 12, 2021, entitled "AUTOMATED-SERVICE RETAIL SYSTEM AND METHOD," which claims priority to U.S. patent application Ser. No. 15/816,832, filed on Nov. 17, 2017 entitled "AUTOMATED-SERVICE RETAIL SYSTEM AND METHOD," and U.S. Provisional Patent Application No. 62/423,614, filed on Nov. 17, 2016, entitled "AUTOMATED-SERVICE RETAIL SYSTEM AND METHOD," which applications are incorporated by reference herein in their entirety.

TECHNICAL FIELD

The present invention relates to a system and method for automated service at a retail location suitable for combining brick-and-mortar and online shopping methods and systems. In particular, the present invention relates to a retail location providing a combination automated and self-service shopping experience.

BACKGROUND

Since its invention by Clarence Saunders in 1916 (U.S. Pat. No. 1,242,872), the self-service store has come to dominate the retail landscape to such an extent that one hundred years later the generic word "store" means a self-service store by default. Indeed, it is difficult for many people, especially retailers, to even imagine a different form of brick-and-mortar retail model or system.

Since the emergence of the Internet in the late 1990's, the advantages of e-commerce, especially as practiced by online retailers such as Amazon, Inc., have convinced consumers to shift a steadily increasing proportion of their shopping to online systems. After only twenty years, e-commerce in general has become so disruptive to in person retail shopping that such online services are now seen by many experts to pose an existential threat to brick-and-mortar retailing operating under the self-service model.

However, both brick-and-mortar locations and online shopping methods and systems experience some shortcomings. For brick-and-mortar locations, the self-service store model is antiquated with the creation of the Internet, and retailers are losing market share to online retailers that can offer reduced prices and convenience when shopping online. There are a number of compelling advantages to online shopping over self-service stores. For example, customers can simply place an order(s) electronically, without having to go to the store, and the retailer (not the customer) is responsible for picking and shipping the items, to fulfill the order. As a result, online shopping enables an additional benefit of eliminating the need to endure the universally despised checkout line, which is a necessary evil of the self-service model. Additional advantages of shopping online are that customers can order any time of day from any location, product assortment can be vastly larger because fulfillment centers have far more storage capacity than individual brick-and-mortar stores, and because more "longer-tailed" products can be stocked economically to serve aggregated demand from a much larger pool of customers than would shop at a single store, an array of powerful decision-support tools are available to shoppers online, especially product-reviews, and orders can be delivered to the customers' homes, which is usually highly convenient for the customer.

For online retailers, the penetration of online orders is non-uniform across different product and store categories, with a dramatically lower penetration in food than in all other major categories. Part of the reason for this difference certainly has to do with food-perishability constraints and the resulting logistical complexity with the delivery function. A more fundamental reason, however, is that the relative advantages of a brick-and-mortar store vs. online are far more important in food than any other category.

In particular, from a customer perspective, brick-and-mortar retailing has a number of advantages over online retailing, including (1) immediacy, order-fulfillment can occur very quickly from locally stored picking stock; (2) the opportunity for the customer to physically examine products before purchasing them (e.g., non-fungible, damage, etc.); (3) the availability of retail associates in the store to provide service; and (4) the opportunity to provide stimulating in-store experiences and social interactions that customers value.

In attempt to bridge the gap between online shopping and in-person self-service shopping, brick-and-mortar retailers have expanded into e-commerce and offer customers the opportunity to place their orders online and either pick them up at stores or have them delivered to their homes. The online ordering methodology implemented by self-service retailers, however, requires the retailer to incur the cost of picking orders (a task that self-service customers normally perform at no cost to the retailer) and are constrained by competitive pressures from raising prices to cover these additional costs. Moreover, picking these orders in-store is so inefficient and disruptive to self-service customers that even relatively small sales volumes force retailers to move fulfillment to dedicated facilities. Brick-and-mortar retailers offering online sales commonly experience increases in both variable and fixed costs without increasing sales (i.e., people don't eat more because they order online). This "multi-channel" model is ultimately, therefore, a complex strategy and difficult to implement successfully. The more successful a retailer's move online, the faster that retailer will be forced to close stores, or go bankrupt.

SUMMARY

There is a need for a system and method capable of implementing an optimized shopping experience for customers at brick-and-mortar locations that can compete with online retailers. The present invention is directed toward further solutions to address this need, in addition to having other desirable characteristics. Specifically, the present invention enables an automated-service operating model implemented at brick-and-mortar store locations that is demonstrably superior to both self-service brick-and-mortar retail models and to online retailer models, in terms of both customer experience and retailer profitability. In particular, the present invention provides retailers, including food retailers, with a method and system for converting self-service model retail locations into highly automated order-fulfillment centers for all or a portion of goods.

In accordance with example embodiments of the present invention, an automated store is provided. The automated store includes a building having an automated fulfillment section and a shopping section including a checkout section, and a delivery section. The shopping section includes a mock marketplace presenting fungible goods to customers for order selection, one or more shopping terminals for selecting one or more fungible goods from the mock marketplace, and one or more picking stations presenting one or more non-fungible goods for custom-picked selection. The automated fulfillment section includes an automated fulfillment system. The automated fulfillment system includes a storage structure including a plurality of rack modules separated by aisles and having a plurality of storage levels, the storage structure storing a plurality of totes that are empty when empty storage totes, contain eaches when storage totes, contain orders when order totes, or combinations thereof. The automated fulfillment system also includes at least one mobile robot capable of storing and retrieving totes from the storage structure, wherein the automated fulfillment system picks the one or more fungible goods and organizes the one or more fungible goods into one or more order totes for delivery to the customers. The checkout section includes one or more non-fungible goods drop-off stations receiving one or more non-fungible goods picked from the one or more picking stations and one or more checkout terminals having a configuration enabling the customers to render payment for the one or more fungible goods and the one or more non-fungible-goods. The delivery section includes a merge module that combines the one or more fungible goods from the automated fulfillment section with the one or more non-fungible goods picked from the shopping section into a delivery bundle and a pickup station receiving the delivery bundle and storing the delivery bundle in an assigned location until the customers arrive to take delivery of the delivery bundle.

In accordance with aspects of the present invention, the mock marketplace includes virtual or tangible displays of the one or more fungible goods that are scannable, images, or codes.

In accordance with aspects of the present invention, the one or more shopping terminals present purchasable goods to customers for order selection.

In accordance with aspects of the present invention, the picking stations enable the customers to directly hand-pick non-fungible goods. The picking stations can also include pickers that custom-pick non-fungible goods based on instruction from the customers, where the pickers are human and/or the pickers are robots.

In accordance with aspects of the present invention, the drop-off stations include assessment tools configured to identify the one or more non-fungible goods. The assessment tools include a scale for determining weight and an optical scanner for reading images, and labels, or codes.

In accordance with aspects of the present invention, the one or more non-fungible goods are placed in one or more totes in the shopping section. The one or more non-fungible goods drop-off stations receive totes containing the one or more non-fungible goods. The delivery bundle comprises one or more shopping bags containing the one or more fungible goods, the one or more non-fungible goods, or both. The delivery bundle can include one or more shopping bags.

In accordance with aspects of the present invention, the merge module removes the one or more non-fungible goods and the one or more fungible goods from totes and combines them into shopping bags in a preferred arrangement. An example arrangement is based on weight of items with heavier items placed on the bottom of the shopping bags and lighter items placed at the top. An example arrangement is also based on contents of items in such a way that food items are placed together in the shopping bags and non-food items are placed together in the shopping bags separate from the food items. An example arrangement is further based on crushability of packaging of items.

In accordance with aspects of the present invention, the shopping section is on a ground level of the automated store and the automated fulfillment section is above the shopping section.

In accordance with aspects of the present invention, the automated fulfillment section is on a ground level of the automated store and the shopping section is above the automated fulfillment section.

In accordance with aspects of the present invention, the automated fulfillment section includes an inventory of fungible goods in a storage system configured for automated picking by a plurality of robots. The fungible goods can be disposed in totes stored in rack modules of the automated fulfillment system.

In accordance with aspects of the present invention, the at least one mobile robot propels itself horizontally and vertically throughout the storage structure, placing totes into the storage structure, removing totes from the storage structure, and transporting totes.

In accordance with example embodiments of the present invention, a method for automated order fulfillment at an automated store is provided. The method includes receiving at least one order for one or more goods at the automated store from a customer and initiating a plurality of robots to pull the one or more goods from inventory for picking at a picking station. The method also includes the plurality of robots configured to pull inventory totes including goods for the one or more goods in the at least one order from inventory and deliver the totes to the picking station and pickers at the picking station pulling the one or more goods from the delivered totes. The method further includes packing the one or more goods in an order-tote associated with the at least one order and delivering completed the completed order-tote to the customer.

In accordance with example embodiments of the present invention, at least one order is one of an online order originating from a remote location and an in person order originating from the automated store. The initiating the plurality of robots for each order of the at least one order can be prioritized based on an origination of an order.

In accordance with example embodiments of the present invention, a system for implementing an automated store service model is provided. The system includes an order processing tool configured to receive at least one order from at least one customer and a non-fungible goods fulfillment tool configured to tally one or more non-fungible goods hand-picked by the at least one customer. The system also includes an automated service fulfillment tool configured to instruct automated robots to pick one or more fungible goods included within the at least one order and a delivery fulfillment tool configured to verify the one or more non-fungible goods, receive payment for the one or more non-fungible goods and the one or more fungible goods form the at least one customer, and deliver the one or more fungible goods to the at least one customer.

In accordance with example embodiments of the present invention, a method of shopping at an automated store is provided. The method includes selecting one or more fungible goods for automated fulfillment utilizing a shopping terminal, collecting and tallying one or more non-fungible goods in a non-fungible goods fulfillment section, verifying and paying for the one or more fungible goods and the one or more non-fungible goods, and receiving delivery of the one or more fungible goods.

In accordance with example embodiments of the present invention, an automated store is provided. The automated store includes a shopping section. The shopping section includes one or more shopping terminals having a configuration enabling customers to browse and select one or more fungible goods for fulfillment by an automated fulfillment system and a non-fungible goods fulfillment section having a configuration enabling the customers to browse and select one or more non-fungible goods for hand-picked selection by the customers. The automated store also includes a fulfillment section. The fulfillment section includes the automated fulfillment system that picks the one or more fungible goods for delivery to the customers, one or more checkout kiosks having a configuration enabling the customers to render payment for the one or more fungible goods and the one or more non-fungible goods, and a delivery fulfillment section where the one or more fungible goods are delivered by the automated fulfillment system to the customers.

In accordance with example embodiments of the present invention, an automated store includes a shopping section. The shopping section includes product selection mechanisms having a configuration enabling customers to browse and select one or more fungible goods for fulfillment by an automated fulfillment system and a non-fungible goods fulfillment section having a configuration enabling the customers to browse and select one or more non-fungible goods. The automated store also includes a fulfillment section. The fulfillment section includes the automated fulfillment system that picks the selected one or more fungible goods for delivery to the customers, a payment system having a configuration enabling the customers to render payment for the one or more fungible goods and the one or more non-fungible goods, and a delivery fulfillment section where the one or more fungible goods are delivered by the automated fulfillment system to the customers.

In accordance with example embodiments of the present invention, the product selection mechanisms comprise one or more of a representative product packaging, a scannable product image, or virtual electronically displayed and selectable product user interface.

In accordance with example embodiments of the present invention, the payment system comprises one or more interactive kiosks. The payment system can also include a virtual payment system accessed by customer devices to execute payment.

In accordance with example embodiments of the present invention, an automated store. The automated store includes a shopping section including a customer shopping area in which customers provide indications of one or more goods for purchase; and a fulfillment section. The fulfillment section includes an automated fulfillment system that picks the selected one or more goods for delivery to the customers at the automated store.

In accordance with example embodiments of the present invention, the shopping section includes product selection mechanisms having a configuration enabling customers to browse and select one or more fungible goods for fulfillment by the automated fulfillment system. The shopping section can also include a non-fungible goods fulfillment section having a configuration enabling the customers to browse and select one or more non-fungible goods for purchase.

In accordance with example embodiments of the present invention, the automated store further comprises a payment system having a configuration enabling the customers to render payment for the one or more fungible goods and the one or more non-fungible goods. The automated store can also include a delivery fulfillment section where the one or more fungible goods are delivered by the automated fulfillment system to the customers.

BRIEF DESCRIPTION OF DRAWINGS

These and other characteristics of the present invention will be more fully understood by reference to the following detailed description in conjunction with the attached drawings, in which.

DETAILED DESCRIPTION

Figure 1:
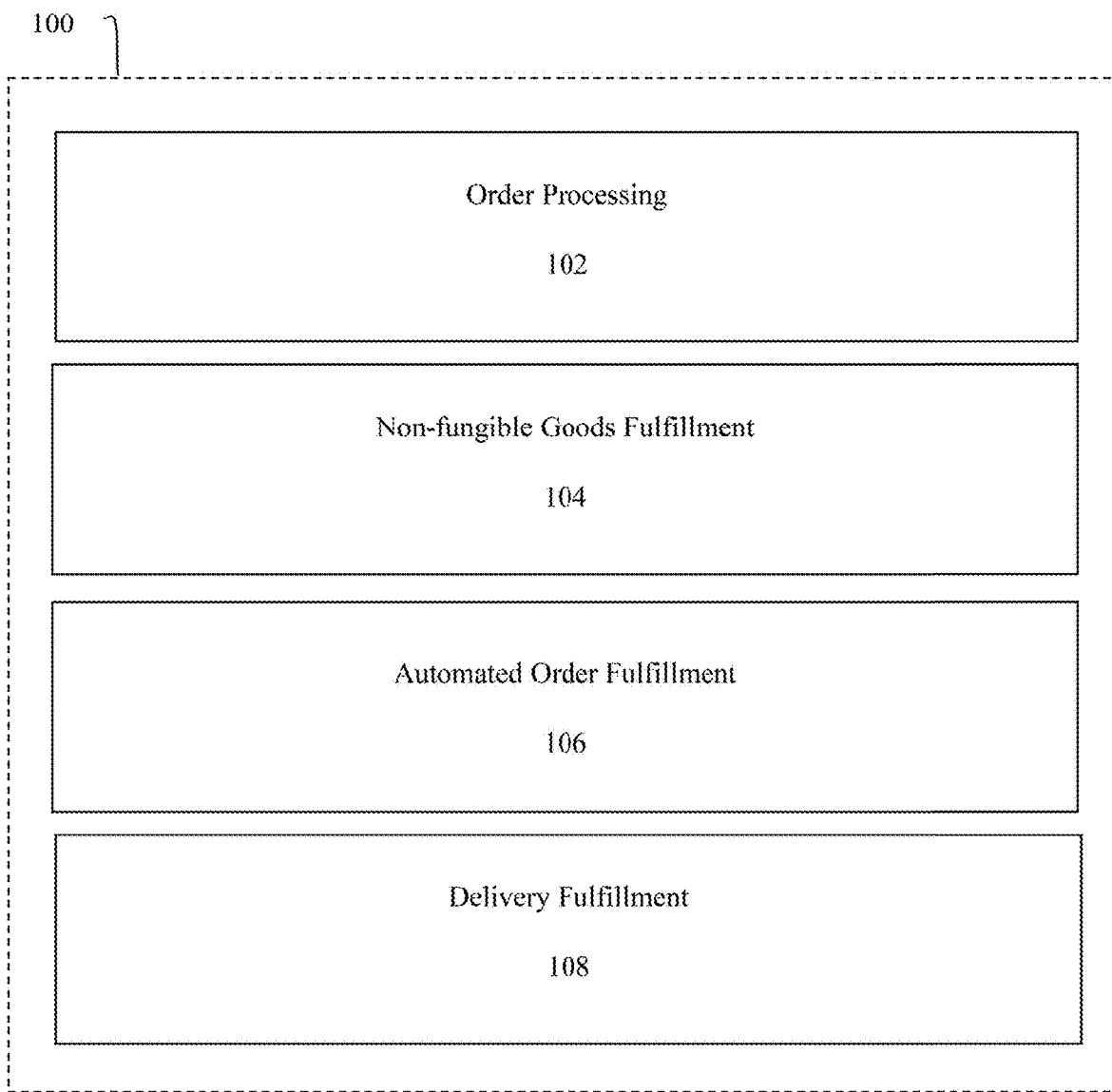
FIG. 1 is an illustrative model for implementing the steps in accordance with the aspects of the invention.

An illustrative embodiment of the present invention relates to a combination automated-service and self-service store for implementation at brick-and-mortar retail locations. The store and corresponding method of implementation is an automated-service model in which robots, deployed at the brick-and-mortar location, fill orders for fungible goods (e.g., pre-packaged goods) placed by customers either online or in-store. The store at the brick-and-mortar location is provided including a front-end shopping section for non-fungible goods or automated service of "fresh" items (e.g., fresh goods, produce, etc.) that customers prefer to pick out by hand. The store further includes a back end automated order fulfillment section for other goods (e.g., packaged goods, dry goods, etc.). In accordance with an example embodiment, a customer places an order for package goods to be picked using the automated system and hand picks non-fungible goods. The two sets of goods are merged (following checkout and payment) for transfer at a transfer station at the brick-and-mortar location to the customer or a delivery proxy for transport to the customer at a local or remote location.

In an illustrative example of food retailing, there is an important distinction between non-fungible goods, such as meat and produce normally located in "perimeter departments" of the store, and fungible goods normally located on shelves throughout the center of the store. That difference in the goods relates to item interchangeability, or "fungibility". With fungible goods, all "eaches" of a given stock-keeping unit (SKU) are essentially identical to each other in all respects important to customers, and are therefore fungible from a customer perspective. For this reason, customers are content to let the retailer select all of their fungible goods. However, with non-fungible goods, the customer prefers to do their own picking, because eaches of a given SKU can vary in attributes that are important to customers, such as marbling in meats and blemishes, color, and degree of ripeness in produce. Many customers (though not all) therefore prefer to select their own non-fungible goods rather than relinquish selection to the retailer. This preference to select produce via in-person inspection is a contributing factor as to why the penetration of online retailing has been so much slower in food than in nearly all other categories of trade.

For purposes of this disclosure, when individual item units or eaches of a given good or product are sufficiently identical that the customer is indifferent as to which specific each is selected from inventory, the eaches of that good can be considered to be "fungible". Conversely, if individual eaches of a given good are different one from another in such a way that a customer might have a preference as to which specific each is selected, then those goods are considered to be "non-fungible". In the context of a retail store, the self-service model adds little value to the customer experience with respect to fungible products, whereas stores implementing automated-service, as discussed with respect to the present invention, adds significant value by eliminating the need for customers to pick their own eaches of fungible goods. For many customers, on most occasions, however, self-service actually adds value to the customer experience with respect to non-fungible products by giving them full control over the selection of specific eaches, and so would be the preferred method of order-fulfillment. For other customers or on other occasions, the convenience of automated service adds more value than self-selection, and so will be the preferred fulfillment method.

Customer experience in the automated-service model of the present invention is maximized by (a) automating the fulfillment of all orders for fungible-goods and virtualizing the fungible goods market entirely, (b) providing a self-service non-fungible goods market that enables customers to select the specific eaches of those goods that they wish to hand select, and (c) optionally enabling customers to order non-fungible goods online and fulfill those orders by either manual, automated picking, or a combination thereof. The automated-service model of the present invention is feasible only if there is an automated order-fulfillment ("each-picking") technology that can meet the demanding requirements of this model. As such, prior systems have been unable to effectively operate an end to end retail system that can leverage automated robots for order-fulfillment in the manner described herein.

As would be appreciated by one skilled in the art, the automated-service model can be implemented in any type of retail store. For example, the automated-service model can be implemented in grocery stores, in home improvement stores, in craft stores, in consumer product stores, or in a combination thereof (e.g., superstores). In each of the types of retail stores, goods can be classified as fungible and non-fungible as described in accordance with the present invention. In particular, the fungible goods are goods that are suitable for automated fulfillment in which customers do not typically care if they pick those goods themselves and non-fungible goods are goods that customers prefer to inspect and hand pick themselves. For example, in a home improvement store, the shopper selected non-fungible goods can include items such as lumber, select building materials (e.g., drywall, plywood, etc.), specialized hardware items, plants, etc. Continuing the home improvement example, the tangible goods equivalent can include pre-packaged hardware items, fixtures, pipe fittings, light bulbs, etc. As would be appreciated by one skilled in the art, some goods can have a display or sample item for individual inspection but still be fulfilled as a fungible item. For example, the store can have samples or display items for flooring, carpet, tile, etc. that customers may want to touch and inspect before purchasing.

Another example retail store ideal for implementation of the automated-service model of the present invention is grocery stores. While the disclosure of the present invention focuses on grocery stores, one skilled in the art will appreciate that the present invention can be implemented in numerous other mass-merchandising brick-and-mortar formats (e.g., home improvement stores, consumer product stores, technology stores, etc.), without departing from the scope of the present disclosure. Such other implementations are contemplated for use in conjunction with the present invention.

FIGS. 1 through 10, wherein like parts are designated by like reference numerals throughout, illustrate an example embodiment or embodiments of an automated-service retail system and method, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative embodiment of the automated service model 100. In particular, FIG. 1 depicts the main components that make up the automated service model 100 of the present invention. The main components of the automated service model 100 include, but are not limited to, order processing 102, non-fungible goods fulfillment 104, automated order fulfillment 106, and delivery fulfillment 108. In accordance with an example embodiment of the present invention, order processing 102 includes receiving an order from a customer (in person or online) and providing the appropriate system (e.g., non-fungible goods, automated fungible goods, etc.) or combination of systems to fulfill the order. While orders for non-fungible goods may also be placed online, most are picked by the customers themselves in the store so that customers can self-select individual item units which are not identical.

In accordance with an example embodiment of the present invention, non-fungible goods fulfillment 104 includes the process, system, and method for shopping for non-fungible goods with specific goods being selected by customers within a store 300. The non-fungible goods are made available to the customers for visual inspection, physical inspection, and selection of the inherently non-identical goods. The non-fungible goods fulfillment 104 process, system, and method is carried out within a shopping section 302 including storage containers (e.g., display cases of stands 606) of non-fungible goods (e.g., produce, meat, etc.) and customer fulfillment tools (e.g., order placement, payment or checkout kiosks 618, etc.) to enable customers to pick their own goods. As would be appreciated by one skilled in the art, the "non-fungible" goods are non-identical goods which can be picked by the customers in a similar fashion as traditional non-fungible goods models and/or a modified non-fungible goods model configured to operate optimally within the automated service model 100.

The automated order fulfillment 106 includes the process, system, and method for providing automated order fulfillment of fungible goods to customers at a store 300. The automated order fulfillment 106 process, system, and method is carried out within an automated fulfillment section 304 that houses inventory suitable for automated picking (e.g., storage totes of fungible goods) using an automated inventory management system for picking the fungible goods. In accordance with an example embodiment of the present invention, the automated inventory management system is a system including automated mobile robots 226 (e.g., Alphabot™ robots) configured to provide the automated order fulfillment 106 from the inventory stored in the automated fulfillment section 304. The automated fulfillment section 304 includes all of the resources for providing automated fulfillment. Additionally, the automated fulfillment section 304 includes storage racks 612 for storing inventory and providing guiderails for robots 226 retrieving the inventory stored on the storage racks 612, transportation to pickers at picking workstations 614, and returning the totes to inventory once the pickers have removed the appropriate goods from the totes. For example, the automated fulfillment section 304 includes storage racks 612 holding totes of goods and robots 226 configured to provide the automated order fulfillment 106. Examples of such configurations are disclosed in detail in U.S. Pat. No. 9,139,363, U.S. Patent Application Publication No. 2014/0288696 U.S. patent application Ser. No. 15/171,802, all of which are incorporated by reference herein.

In accordance with an example embodiment of the present invention, delivery fulfillment 108 includes the process, system, and method for providing all ordered and picked goods to the customers. The delivery of the goods by the process, system, and method of delivery fulfillment 108 can include delivery of any combination of automated fulfilled orders of fungible goods and customer picked non-fungible goods orders as well as in person orders and online orders. Additionally, the delivery fulfillment 108 can include any level of delivery, including but not limited to in-store delivery, customer vehicle delivery, and at home delivery.

Figure 2:
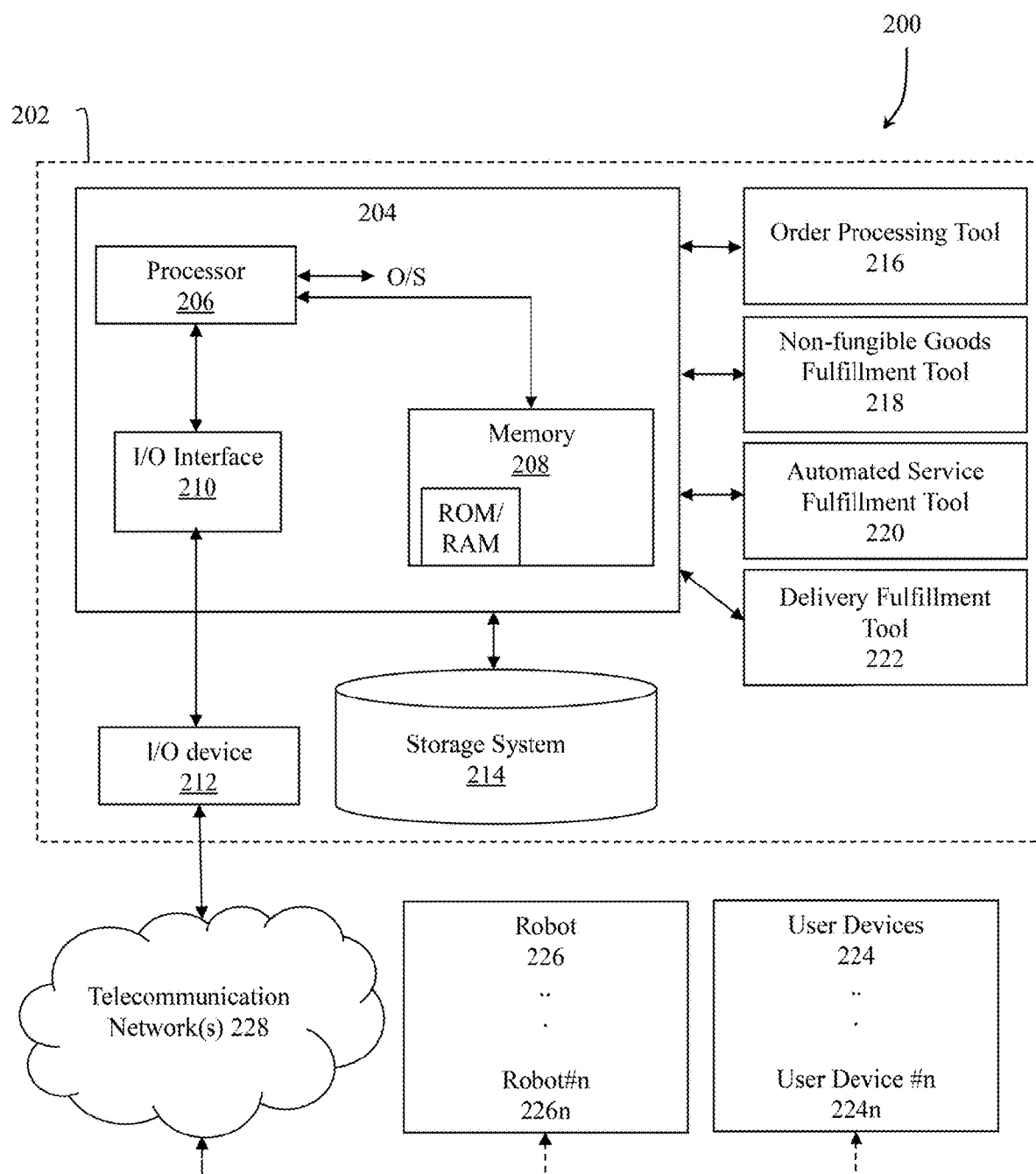
FIG. 2 is an illustrative system for implementing the steps in accordance with the aspects of the invention.

FIG. 2 depicts an illustrative system 200 for implementing aspects of the present invention. In particular, FIG. 2 depicts a system 200 including an automated service system 202. In accordance with an example embodiment, the automated service system 202 is a combination of hardware and software configured to carry out aspects of the present invention. In particular, the automated service system 202 can include a computing system with specialized software and databases designed for providing a method for implementing the automated service model 100. For example, the automated service system 202 can be software installed on a computing device 204, a web based application provided by a computing device 204 which is accessible by computing devices (e.g., the robots 226, the user devices 224, etc.), a cloud based application accessible by computing devices, or the like. The combination of hardware and software that make up the automated service system 202 are specifically configured to provide a technical solution to a particular problem utilizing an unconventional combination of steps/operations to carry out aspects of the present invention. In particular, the automated service system 202 is designed to execute a unique combination of steps to provide a novel approach to customer order fulfillment from a retailer.

In accordance with an example embodiment of the present invention, the automated service system 202 can include a computing device 204 having a processor 206, a memory 208, an input output interface 210, input and output devices 212 and a storage system 214. Additionally, the computing device 204 can include an operating system configured to carry out operations for the applications installed thereon. As would be appreciated by one skilled in the art, the computing device 204 can include a single computing device, a collection of computing devices in a network computing system, a cloud computing infrastructure, or a combination thereof, as would be appreciated by those of skill in the art. Similarly, as would be appreciated by one of skill in the art, the storage system 214 can include any combination of computing devices configured to store and organize a collection of data. For example, storage system 214 can be a local storage device on the computing device 204, a remote database facility, or a cloud computing storage environment. The storage system 214 can also include a database management system utilizing a given database model configured to interact with a user for analyzing the database data.

Continuing with FIG. 2, the automated service system 202 can include a combination of core components to carry out the various functions of the present invention. In accordance with an example embodiment of the present invention, the automated service system 202 includes an order processing tool 216, a non-fungible goods fulfillment tool 218, an automated order fulfillment tool 220, and a delivery fulfillment tool 222. As would be appreciated by one skilled in the art, the tools 216, 218, 220, 222 can include any combination of hardware and software configured to carry out the various aspects of the present invention. In particular, each of the order processing tool 216, the non-fungible goods fulfillment tool 218, the automated order fulfillment tool 220, and the delivery fulfillment tool 222 is configured to enable operation of the automated service model 100 within a store 300.

In accordance with an example embodiment of the present invention, the system 200 includes a plurality of user devices 224 and robots 226 configured to communicate with the automated service system 202 over a telecommunication network(s) 228. The automated service system 202 can act as a centralized host, for the user devices 224 and robots 226, providing the functionality of the tools 216, 218, 220, 222 sharing a secured network connection. As would be appreciated by one skilled in the art, the plurality of user devices 224 can include any combination of computing devices, as described with respect to the automated service system 202 computing device 204. For example, the computing device 204 and the plurality of user devices 224 can include any combination of servers, personal computers, laptops, tablets, smartphones, etc. In accordance with an example embodiment of the present invention, the computing devices 204, the user devices 224, and the robots 226 are configured to establish a connection and communicate over telecommunication network(s) 228 to carry out aspects of the present invention. As would be appreciated by one skilled in the art, the telecommunication network(s) 228 can include any combination of known networks. For example, the telecommunication network(s) 228 may be combination of a mobile network, WAN, LAN, or other type of network. The telecommunication network(s) 228 can be used to exchange data between the computing devices 204, the user devices 224, and the robots 226 exchange data with the storage system 214, and/or to collect data from additional sources.

In accordance with an example embodiment of the present invention, the order processing tool 216 is configured to handle all the processing for order processing 102. In particular, the order processing tool 216 is configured to receive customer order information (e.g., in person or remotely) and allocate the orders accordingly (e.g., dispatch automated order fulfillment), as discussed in greater detail herein. In accordance with an example embodiment of the present invention, the non-fungible goods fulfillment tool 218 is configured to handle all the processing related to non-fungible goods fulfillment 104. In particular, the non-fungible goods fulfillment tool 218 handles all of the operations at a front end of a store 300 including managing customer orders, payment, and other services, as discussed in greater detail herein. In accordance with an example embodiment of the present invention, the automated order fulfillment tool 220 is configured to handle all the processing related to automated order fulfillment 106. In particular, the automated order fulfillment tool 220 is configured to handle the operations at a backend of the store 300 including automated order picking, inventory management, etc., as discussed in greater detail herein. In accordance with an example embodiment of the present invention, the delivery fulfillment tool 222 is configured to handle all the processing related to delivery fulfillment 108. In particular, the delivery fulfillment tool 222 is configured to handle the processing related to delivering fulfilled customer orders to the customer at a particular destination, as discussed in greater detail herein.

In accordance with an example embodiment, the automated service model 100 is implemented within a brick-and-mortar retail store 300 configured for use in accordance with the present invention. The store 300 can be any retail store that provides goods available for sale to customers. In accordance with an example embodiment of the present invention, the store 300 is a grocery store providing groceries and other goods traditionally found at grocery stores to customers. The store 300 of the present invention differs from conventional stores in how customers obtain goods from the store 300. In particular, the store 300 includes a shopping section 302 enabling customers to hand pick goods, as done in traditional grocery stores, or otherwise select goods for automated fulfillment (such as by interactive display, scanning a tag, image, or code, or the like) and the automated fulfillment section 304 with an automated each-picking system that can pick most or all of the items that customers designate within an order (either an online or in person order).

Figure 5:
FIG. 5 is an illustrative transition between a shopping section and a delivery section in accordance with the aspects of the invention.

The novel combination of the store 300 and the automated service model 100 alleviates customers from having to pick entire orders of goods, as in a traditional self-service store. Instead, utilizing the automated service model 100, customers can order some or all of goods the customer wishes to buy electronically through some form of digital device either in the store or remotely, and have the automated order fulfillment 106 pick the goods and deliver the order to the customer at the store 300 location. Simultaneously, the customer can pick any non-fungible goods from the shopping section 302 of the store 300 to be combined with the automated delivered goods at a checkout point within a delivery fulfillment section 308, as depicted in FIG. 5. Implementation of the unique combination of the order processing 102, the non-fungible goods fulfillment 104, and the automated order fulfillment 106 enables the automated service model 100 to provide a scalable, affordable, efficient, compactness/space efficient, reliable, and rapid order-completion system within the store 300. The combination result is a wholly new type of retail store, and retailing system, which provides quantum improvements in both customer experience and retail financial performance for retailers.

Figure 3A:
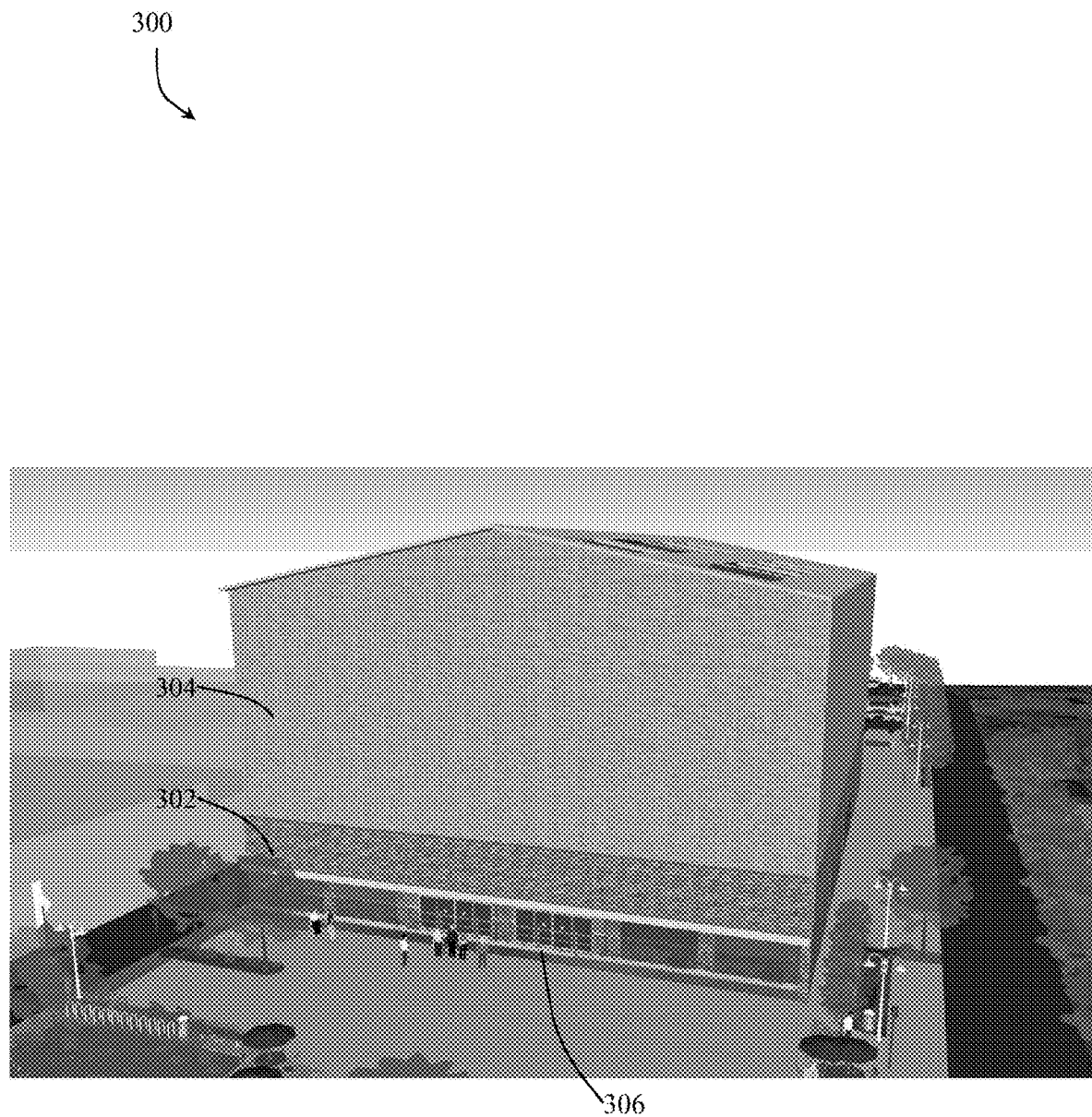
FIGS. 3A, 3B, and 3C are illustrative structures of a store for implementing the steps in accordance with the aspects of the invention.
Figure 3B:
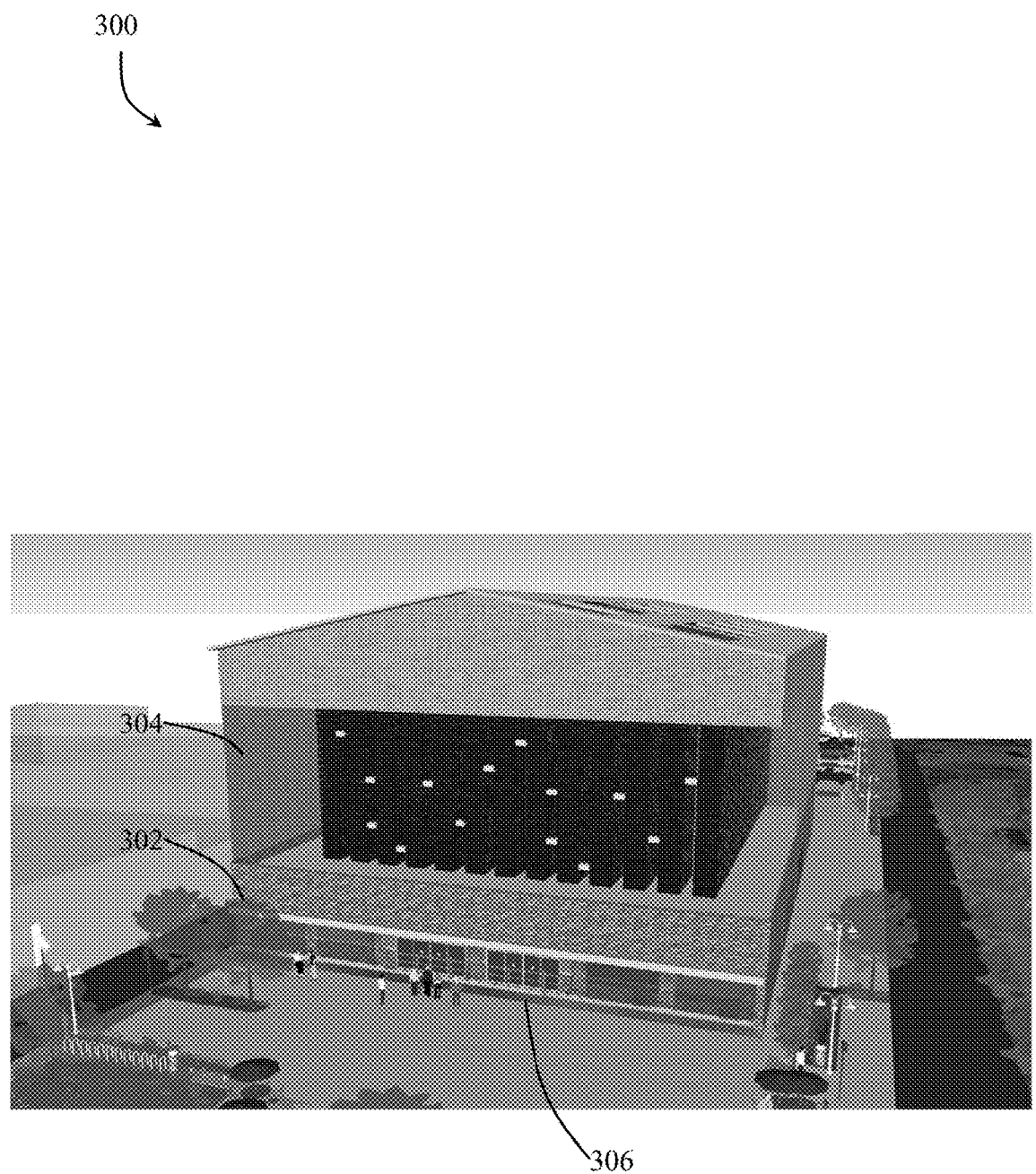
Figure 3C:
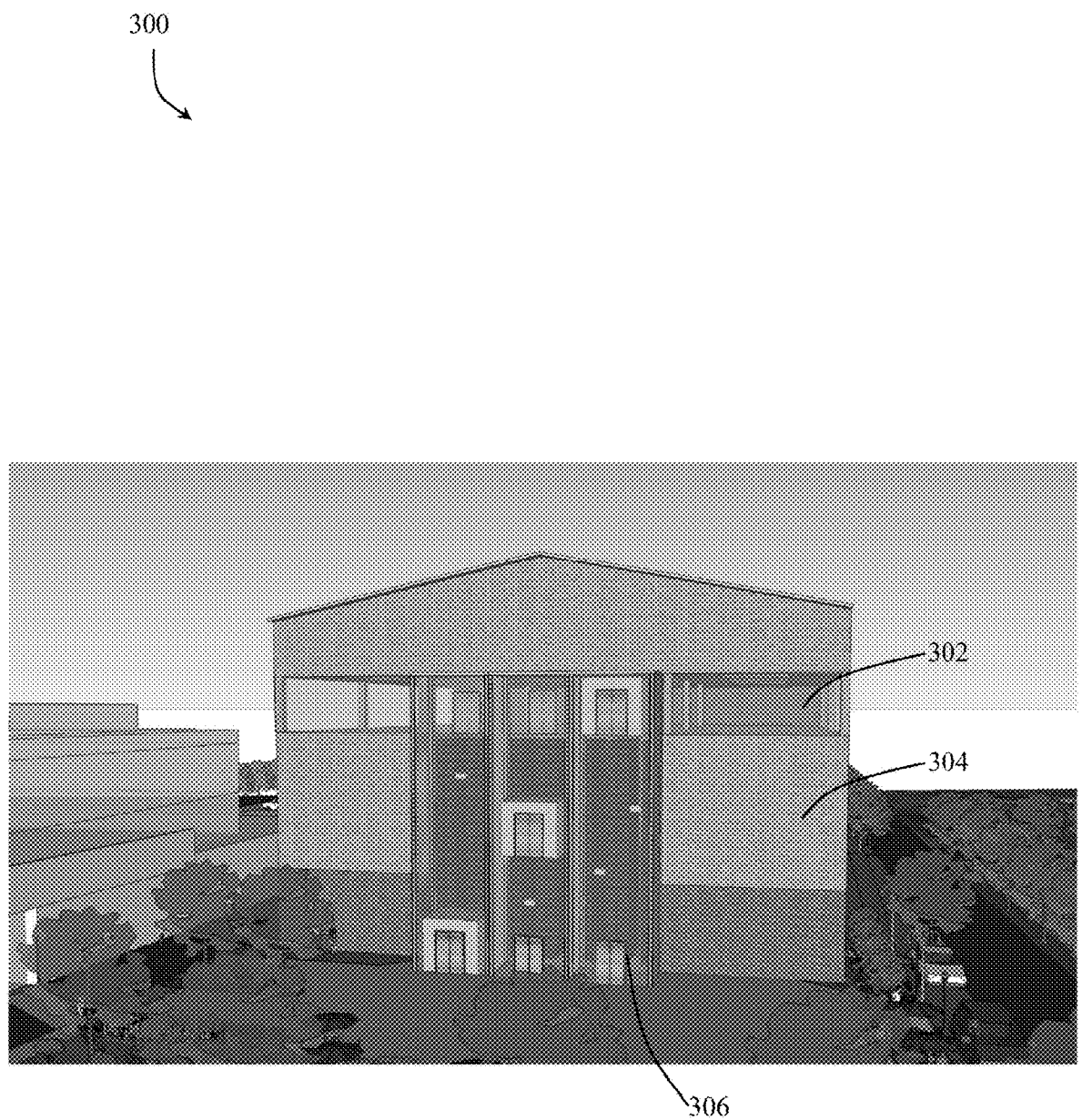

FIGS. 3A, 3B, and 3C show an illustrative depiction of the store 300 configured to operate in accordance with the automated service model 100. In particular, FIGS. 3A, 3B, and 3C show example architectural designs for the store 300 specifically designed for operation of the automated service model 100. FIGS. 3A and 3B depict example embodiments of a store 300 with a shopping section 302 on a ground level and an automated fulfillment section 304 on an upper level of the store 300. As would be appreciated by one skilled in the art, the store 300 can be a newly constructed store 300 specifically designed for operation with the automated service model 100 or a preexisting self-service model store 300 retrofitted to operate within the automated service model 100. In accordance with an example embodiment of the present invention, the shopping section 302 of the store 300 includes entrances 306 for customers as well as the resources (e.g., baskets, carts, shopping terminals, etc.) required for non-fungible goods shopping. For example, the shopping section 302 can include a similar collection of resources and layout of a traditional self-service grocery store. As would be appreciated by one skilled in the art, the shopping section 302 can also include a set of shopping carts and totes, banks of hand-held shopping terminals resting in charging cradles, and a bank of checkout kiosks 618 and stand-alone receipt printers.

FIG. 3B depicts an example embodiment of a store 300 with shopping section 302 on a ground level and an automated fulfillment section 304 on an upper level of the store 300, as discussed with respect to FIG. 3A. In particular, FIG. 3B depicts the store 300 of FIG. 3A with a cross-sectional cut-out to show the automated fulfillment section 304 on the upper level(s) of the store. The automated fulfillment section 304 includes storage racks 612 configured to hold a plurality of totes of goods stored thereon. The storage racks 612 are accessible by mobile automated robots that are configured to remove the totes of goods from the storage racks 612 and deliver them for order fulfillment, as discussed in greater detail herein.

FIG. 3C depicts an example embodiment of a store 300 with an automated fulfillment section 304 on a ground level and a shopping section 302 on an upper level of the store 300. The store 300, as depicted in FIG. 3C includes the same resources within the shopping section 302 and the automated fulfillment section 304 but in a different orientation. In particular, the automated fulfillment section 304 begins on a ground level with one or more elevator entrances 306 up to the shopping section 302 on an upper level located above the automated fulfillment section 304. As an added benefit of having the shopping section 302 on an upper level, the store 300 can include additional windows throughout to provide incoming light and an enhanced view for customers.

Figure 4A:
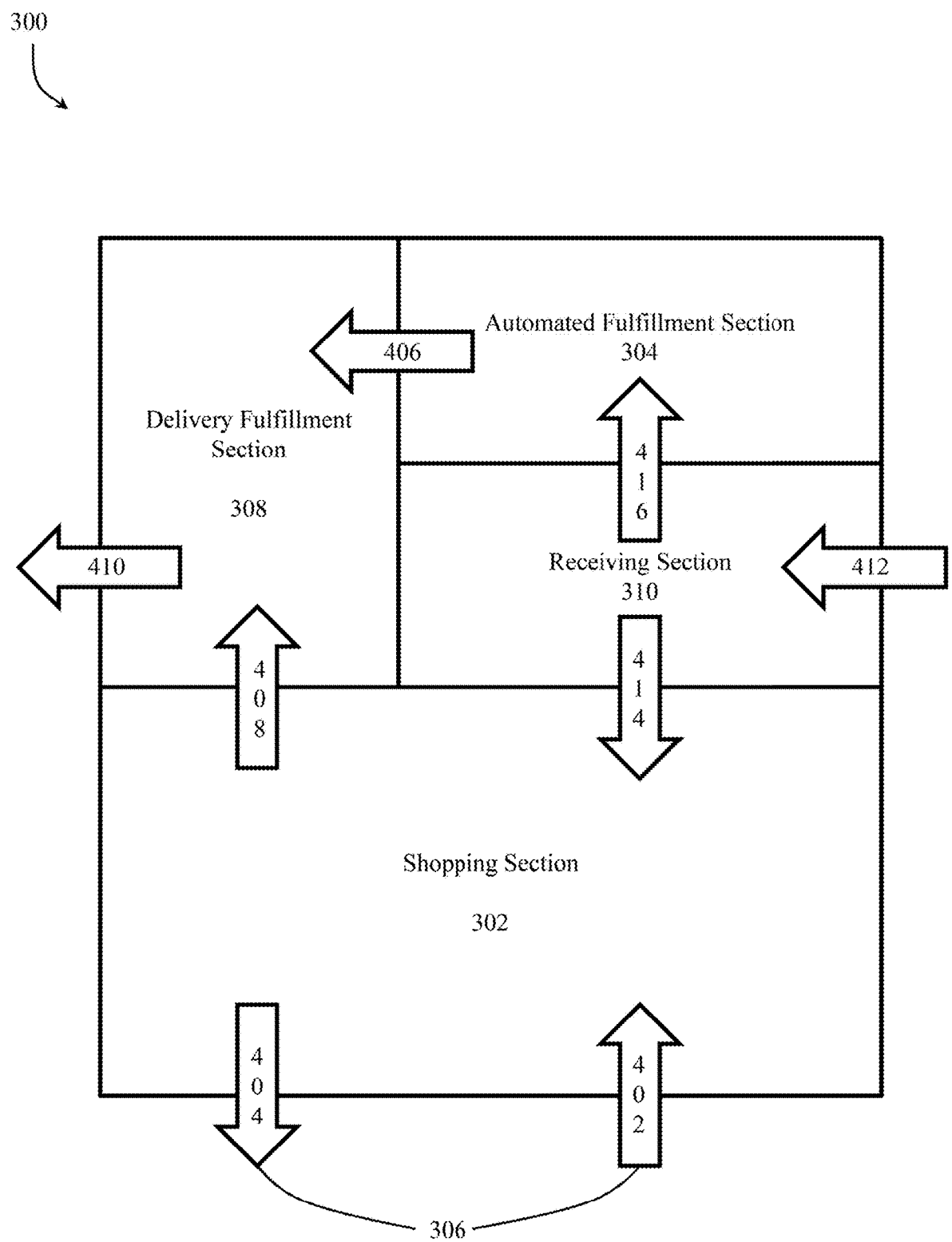
FIGS. 4A, 4B, and 4C are illustrative representations of an internal layout of a store for implementing the steps in accordance with the aspects of the invention.

FIG. 4A depicts a representative conceptual internal layout of the store 300 and how each of the areas of the store 300 relates to one another. In particular, FIG. 4A depicts the shopping section 302, the automated fulfillment section 304, a delivery fulfillment section 308, and a receiving section 310. Although the different areas represented in FIG. 4A are represented within a single plane, the areas can be divided on multiple floors of a store 300, as depicted in FIGS. 3A-3C. During operation of the store 300, all transactions occur through one or more of these areas. In accordance with an example embodiment of the present invention, customers utilize the entrances 306 to enter 402 and exit 404 the shopping section of the store 300. Once inside the shopping section 302 of the store 300, customers can place orders for goods to be fulfilled by the automated order fulfillment 106 and can shop for non-fungible goods within the non-fungible goods fulfillment 104 section of the store, as discussed in greater detail herein.

Customer orders to be fulfilled by the automated order fulfillment 106 will be processed by the automated system within automated fulfillment section 304, as discussed in greater detail herein. When the automated order fulfillment 106 has been completed, the automated picked goods will be provided 406 to the delivery fulfillment section 308, as discussed in greater detail herein. Similarly, when customers have completed picking non-fungible goods within the shopping section 302, the customers will provide 408 the goods to the delivery fulfillment section 308, as discussed in greater detail herein. For example, the customers can place a tote or basket with their goods through a window to the delivery fulfillment section 308 as depicted in FIG. 5. At the delivery fulfillment section 308 goods provided 406 from the automated fulfillment section 304 and goods provided 408 from the shopping section 302 will be combined into a single order for delivery 410 to the customer, as discussed in greater detail herein.

Continuing with FIG. 4A, the store 300 can include the receiving section 310 for receiving goods from various suppliers and/or manufacturers. The receiving section 310 can be included within a "back end" of the store that is not seen by customers. When goods are delivered to the receiving section 310 the goods are identified as non-fungible goods for storage within the shopping section 302 or fungible goods for storage within the automated fulfillment section 304. The non-fungible goods will be transferred 414 to the shopping section and stored in a manner to provide non-fungible goods fulfillment 104. Similarly, the fungible goods will be transferred 416 and stored in a manner suitable for automated order fulfillment 106 (e.g., stored in totes and place into storage rack 612).

Figure 4B:
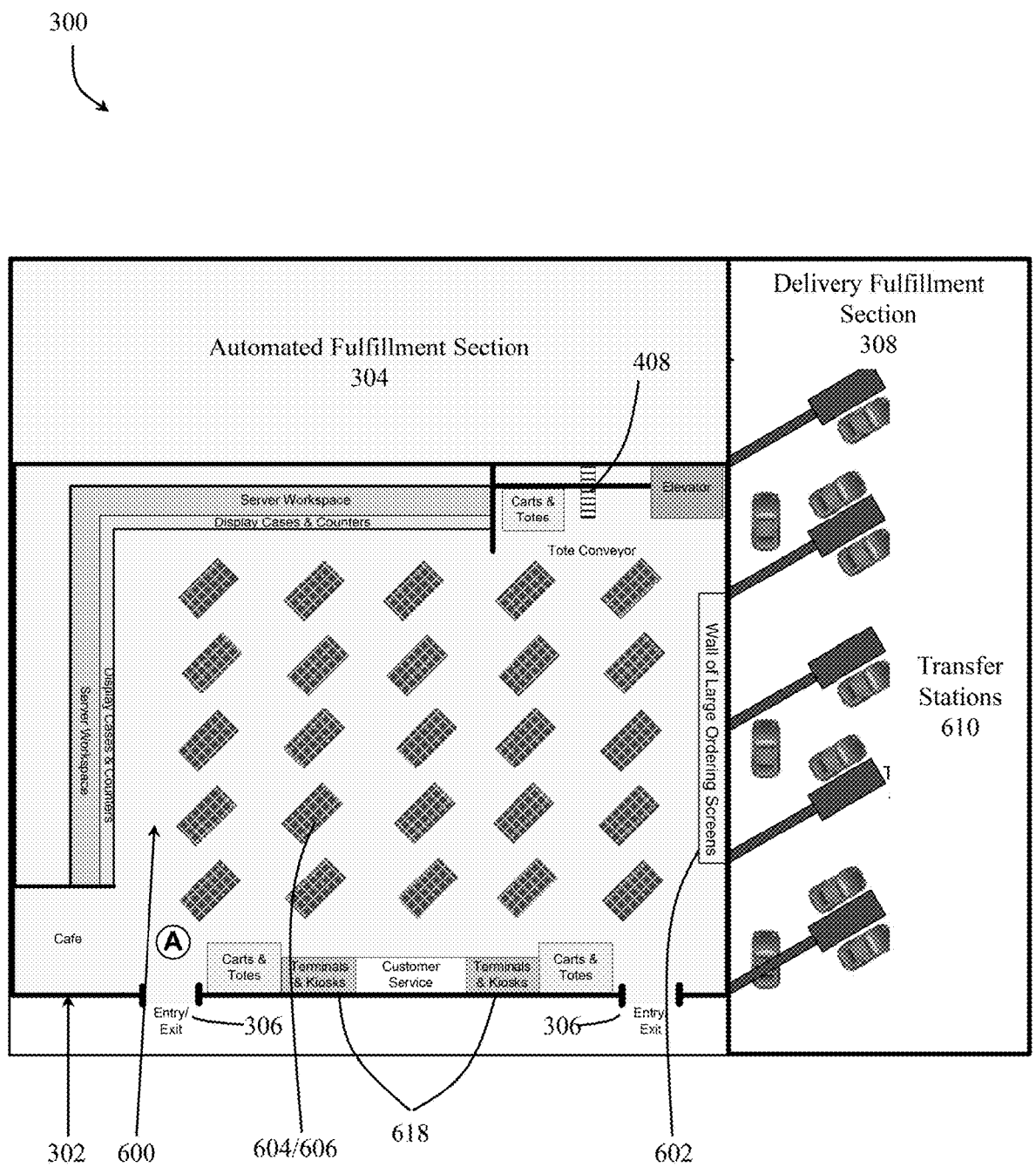

FIG. 4B depicts a more detailed view of the internal structure of the store 300 as discussed with respect to FIG. 4A. In particular, FIG. 4B depicts a detailed view of the shopping section 302, the delivery fulfillment section 308, a plan view of the automated fulfillment section 304, and how those sections relate to one another. The shopping section 302, as depicted in FIG. 4B, includes entry and exit points 306, a mock market 600, and a pass through 408 to the automated fulfillment section 304. The mock marketplace 600 includes a wall of ordering screens 602, a plurality of physical shelving units 604 and display cases of stands 606, and a plurality of shopping terminals and checkout kiosks 618. As would be appreciated by one skilled in the art, the mock marketplace 600 can include any combination of the elements depicted in FIGS. 4B-6C as discussed in greater detail herein. Additionally, FIG. 4B depicts the delivery fulfillment section 308 of the store 300. The delivery fulfillment section 308 includes a plurality of transfer stations 610 which completed orders of goods are delivered for acceptance by customers.

Figure 4C:
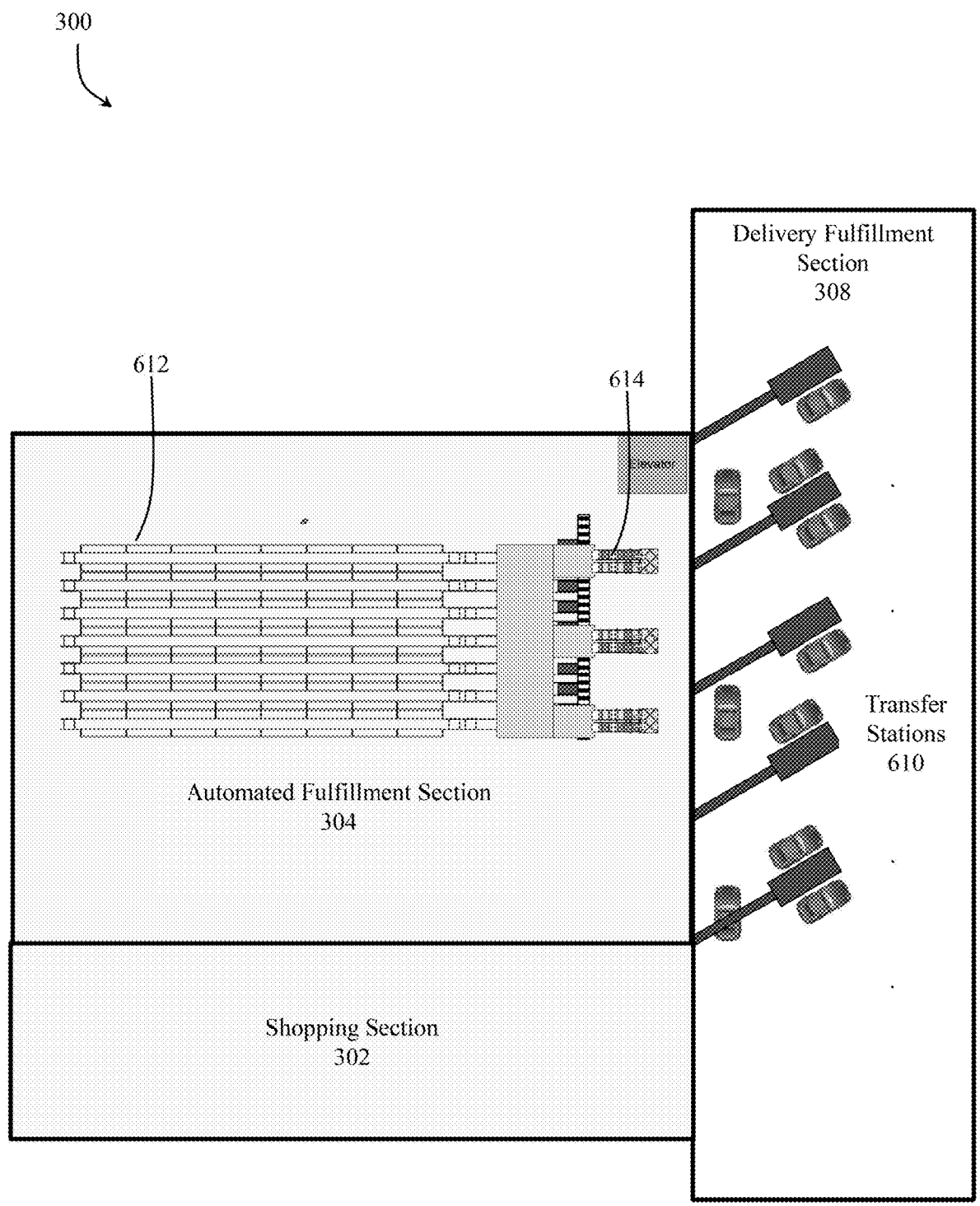

FIG. 4C depicts a more detailed view of the automated fulfillment section 304, the delivery fulfillment section 308, a basic view of the shopping section 302, and how those sections relate to one another. The automated fulfillment section 304 includes the storage rack 612 system configured to hold totes of inventory accessible by the robots 226 and further configured to enable the robots 226 to pull inventory totes and deliver the totes to pickers at picking workstations 614 for automated order fulfillment 106. In accordance with an example embodiment of the present invention, the delivery fulfillment section 308 includes a consolidation section in which goods from the automated fulfillment section 304 and goods from the shopping section 302 are combined and consolidated into order totes 702 for delivery to customers at the transfer stations 610. As would be appreciated by one skilled in the art, the consolidation can occur within the same physical space as the automated fulfillment section 304 or in a separate physical space.

In accordance with an example embodiment of the present invention, the store 300 of the automated-service model 100 includes a "front end" including an entry lobby, the shopping section 302 for non-fungible-goods, and associated work areas. As would be appreciated by one skilled in the art, the front end does not necessarily need to be located at a front of the store 300 or on a ground level of the store 300. The vast majority of floor space within the shopping section 302 is devoted to a non-fungible-goods market (e.g., produce, fresh goods and other non-fungible goods) and associated work spaces, which can be the focal point of the store 300 from a customer perspective. The shopping section 302 includes "non-fungible" goods such as produce, meat, seafood, many cheeses (primarily random-weight), deli, floral, bakery, and prepared foods. Typically, non-fungible goods will be sold from display fixtures or cases 606 with as many as three different pricing methods, including but not limited to "random dollar" (fungible with a price barcode), random weight (loose items, especially produce, priced based on item weight), and random count (loose items priced based on number of eaches). These non-fungible goods can also be sold at service counters that offer the customer more opportunity to customize ordered products according to their individual tastes and preferences.

In accordance with an example embodiment of the present invention, the shopping section 302 of the store 300 is similar in appearance to perimeter departments within traditional self-service grocery stores with technology enhancements, related to the automated-service model 100, to improve customer convenience and reduce retailer operating costs. The technological improvements for the shopping section 302 are primarily related to how customers shop for goods and exchange funds for those goods. One such technological improvement is the implementation of shopping terminals to be utilized in combination with the automated-service model 100. The shopping terminals are devices utilized by customers as the primary interface to select, scan, enter, and/or store goods for an order to be placed during shopping trip, including an exchange of funds for the order. In particular, the shopping terminals can be utilized to place orders for both fungible goods (to be picked by the automated order fulfillment 106) and non-fungible goods within the non-fungible goods fulfillment 104.

As would be appreciated by one skilled in the art, the shopping terminals can be any device configured to identify a particular good (e.g., via scan, photo, etc.) to be added to a shopping list. For example, the shopping terminals can be a portable scanning device or one or more fixed touch screens located within the shopping section 302. Additionally, user devices 224 (e.g., smart phones) of customers can be configured as shopping terminals by executing a mobile application associated with the store 300 on the mobile device. For purposes of this disclosure, the term "shopping terminal" is defined to include an application running on a user device 224 or a standalone specialized shopping terminal device (e.g., portable scanner, stationary screen, or a combination thereof). In operation, the shopping terminal interacts with the customer and communicates with the central automated service system 202 to support a broad set of functions involved in the shopping process. Each shopping terminal has a unique internal identifier that is included in messages, and the process of obtaining a shopping terminal includes a step in which the customer's identity is captured, e.g. via a radio frequency identification (RFID) key fob or an near field communication (NFC) chip in the customer's smart phone, or by entry of information at, e.g., a checkout kiosk 618 or service desk. The shopping terminal associated with the customer is used to pick the items desired for their shopping order to be picked by the automated order fulfillment 106 and by the customer within the non-fungible goods fulfillment 104.

Figure 6A:
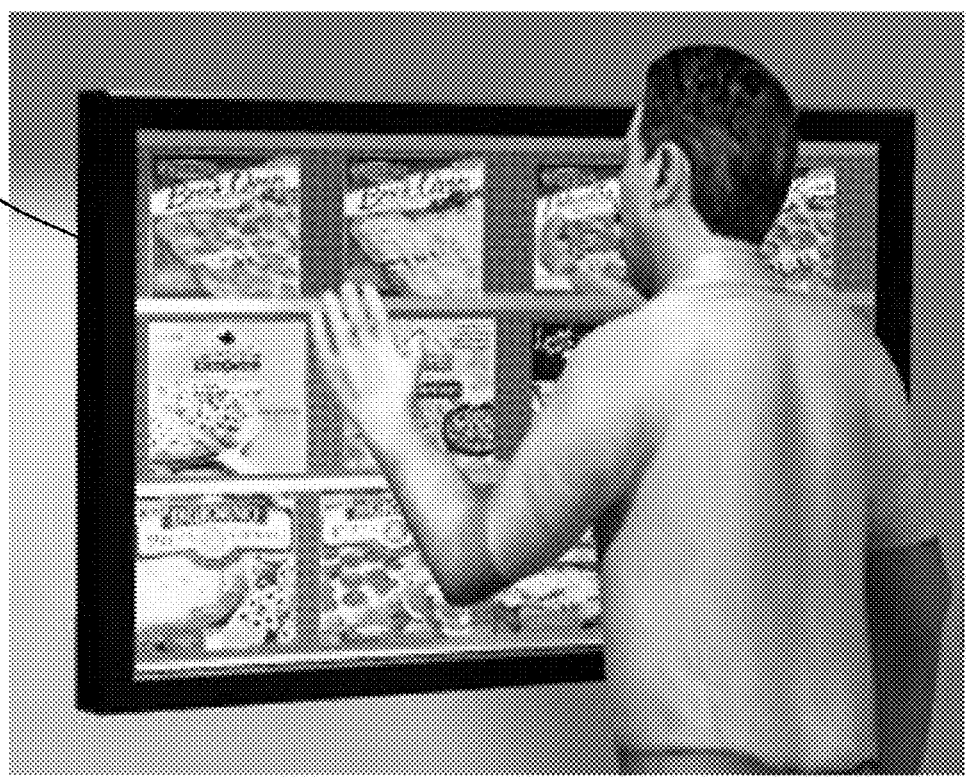
FIG. 6A is an illustrative virtual mock marketplace in accordance with the aspects of the invention.
Figure 6B:
FIGS. 6B and 6C are illustrative physical mock marketplaces in accordance with the aspects of the invention.
Figure 6C:

In accordance with an example embodiment of the present invention, the shopping section 302 includes screens 602 representing a virtual fungible-goods market for ordering fungible goods to be picked by the automated order fulfillment 106. In particular, the virtual fungible-goods market combines the order processing 102 and non-fungible goods fulfillment 104 to enable a customer to select an order of goods to be picked by the automated order fulfillment 106. In accordance with an example embodiment of the present invention, the shopping section 302 includes a mock marketplace 600 with demo or sample products with SKUs (e.g., empty boxes, pictures, etc.) on physical shelving units (as typically found in a traditional market), or images of such goods made available for browsing of goods (electronic display, or tangible images or illustrations). Example implementations of the mock marketplace 600 are depicted in FIGS. 6A-6C. In particular, FIG. 6A depicts the mock marketplace 600 with a screen 602 displaying a virtual fungible-goods market, FIG. 6B depicts the mock marketplace 600 with demo or sample products within physical shelving units 604 and aisles (similarly laid out to traditional self-service stores) with on example demo product for each fungible in inventory, and FIG. 6C depicts display cases of stands 606 containing non-fungible produce for manually picking by customers. As would be appreciated by one skilled in the art, although the aisles with demo products can be similar to a traditional store, the scale is significantly smaller because there is only one demo product (or scannable or selectable image or code) for each item in inventory, and the aisles can be much narrower without shopping carts in the store.

In accordance with an example embodiment of the present invention, the mock marketplace 600 is limited to picking the goods available via the virtual marketplace. The virtual marketplace includes a plurality of screens (e.g., shopping terminals) 602 mounted on walls or panel floor-stands, which display a combination of selectable fungible goods and non-fungible goods available in inventory. The customer utilizes the screen(s) 602 to browse and select which goods they want to add to their shopping order. FIG. 6A depicts an example representation of the virtual marketplace screens 602 for use within the mock marketplace 600. Similarly, customers can utilize an application or webpage on a user device 224 to browse and select goods for an order (in person or remotely). As would be appreciated by one skilled in the art, the virtual marketplace screens 602 can include any combination of computing display devices configured to receive a user input. For example, the screens 602 can be touch screens configured to display the goods and receive input from customers view a touch interface.

In accordance with an example embodiment of the present invention, the mock marketplace 600 can include ordering goods for automated order fulfillment 106 through a combination of virtual shopping screens 602, a physical mock marketplace 600, and a non-fungible goods marketplace. For example, customers can order fungible goods from aisles of shelving 604 containing mock fungible goods, as depicted in FIG. 6B by using shopping terminals to read radio frequency identifier (RFID) tags associated with the mock goods. Similarly, the customers can order and/or supplement their order from smaller touch-screen 602 located nearby the display cases or stands containing non-fungible goods 606 by reading an RFID tag on the screens 602 to activate an ordering session, as described herein. In either scenario the RFID tags can be embedded within the mock display items, as well as on the price labels on the shelving of the display cases or stands 606, such that the goods can be scanned and added to an order by using portable shopping terminals to read the RFID tags. This embodiment has the advantage of resembling the user interface in fungible-goods markets of self-service stores, by allowing handling and examination of product items. In an example implementation, in the mock marketplace 600, the user can browse goods by walking through the aisles and scanning demo products to be added to the shopping list.

Additionally, the smaller screens 602 can be utilized for the cross-promotion of goods. For example, screens 602 attached to the display cases or stands 606 containing vegetables can display content promoting salad dressing configured enable customers to order the related fungible goods directly through the associated screens 602 (e.g., scanning an RFID tag). In this example embodiment, the fungible goods are completely virtualized and the non-fungible goods marketplace is not, and customers order fungible goods via screens in the store in much the same way in similar manner to shopping remotely on in-home or mobile devices. For example, the store 300 can include a primary set of large screens 602 mounted along a wall to minimize floor-space requirements with additional screens 602 (typically smaller) positioned throughout the non-fungible goods market. Accordingly, regardless of a customer's location within the store 300, the customers can initiate the process of ordering fungible goods on the screens 602 by using a portable shopping terminal to read an identifying tag (e.g. RFID tag or barcode) on an available screen 602, which would then activate an ordering session on the screen 602.

In accordance with an example embodiment of the present invention, the order of goods provided by the screens 602 are processed by an order processing tool 216 and provided to an automated order fulfillment tool 220 for execution through the automated order fulfillment 106. The automated order fulfillment 106 processes the order and delivers the completed order of goods to the customer at a later time period (e.g., at the delivery fulfillment section 308), as discussed in greater detail herein. As would be appreciated by one skilled in the art, the non-fungible goods fulfillment 104 can also be selected in a similar manner, for automated fulfillment, in which a customer selects non-fungible goods from a pool of uniquely identifiable goods displayed on the screens 602. Thereafter, the selection of the non-fungible goods can be picked for the customer using either an automated means or a third party proxy to do the picking (e.g., at a picking workstation 614). Additionally, the order processing 102 can provide feedback to the customer as to a status of the order, a list of goods within the order, a total cost of the order, and other information related to the order. For example, the order processing tool 216 provides a reasonably accurate estimate of the wait time before completion of the order, and then notifies customers the status of the order (e.g., via the personal shopping terminals). When the order is completed, the customer can be notified (e.g., via an application on a portable shopping terminal, an in store status screen, email or short message service (SMS), etc.) that the order is ready for pickup and/or delivery.

In accordance with an example embodiment of the present invention, the shopping section 302 of the store 300 includes a non-fungible market for goods (e.g., produce) which customers prefer to physically inspect, handle, and pick the non-fungible goods themselves (e.g., unautomated). For purposes of this disclosure these types of goods are referred to as non-fungible goods and/or fungible goods. For example, customers can browse non-fungible produce sections for fruits and vegetables as they would in a traditional self-service grocery store. Additionally, customers can order non-fungible goods from various stations included within the shopping section 302. The stations can include, but are not limited to, a deli service counter, a seafood service counter, a bakery, a prepared foods and restaurant station(s), meal kits, etc. Non-fungible goods can be handled in multiple modes: a proxy manual picker (e.g., a store employee picks non-fungible goods on behalf of a customer, typically via an online order), customer selection of non-fungible goods (in person or online), customers at stations (e.g., deli, bakery, seafood, etc.), or customer in store non-fungible goods selection. The customer can tally and add the non-fungible goods to an order through non-fungible goods selection in the shopping section 302 by utilizing a combination of scales 608, as depicted in FIG. 6C (to weigh the goods), RFID labels, barcodes, and manual user product identification. For example, a customer can select a bunch of bananas, weigh the bananas and enter into a shopping terminal the identification of bananas and the weight associated therewith.

In accordance with an example embodiment of the present invention, the non-fungible goods fulfillment 104 provides another technological improvement with a process, system, and method for how customers tally non-fungible items in the shopping section 302, compared to the checkout process in conventional marketplaces. The tallying process of the present invention enables customers to tally goods they wish to purchase in a simple and efficient manner across all pricing methods. In particular, the shopping section 302 provides the customer a simplified and efficient manner for customers to order/pick-out non-fungible goods (e.g., tally) and pay for those goods utilizing a combination of shopping terminals in combination with wireless scales 608 positioned at locations throughout the store 300 for convenient use. For example, the section of the shopping section 302 containing fruits will include checkout kiosks 618 and scales 608 for the customer to enter a quantity and weight of a particular fruit item(s) to be added to the customer's order. Once the non-fungible goods are tallied and weighed, they can be added to the customer's order (e.g., via the shopping terminal) such that all customer handpicked goods and automated picked goods will be reflected within a single shopping order. As would be appreciated by one skilled in the art, a customer order can be updated with a tally for each item added to a customer basket or cart while the user shops in the shopping section 302. During a checkout process, the tally and weight of the items in the customer baskets/carts can be verified and processed.

In accordance with an example embodiment, the customer picked non-fungible goods verification process can take place at a checkout kiosk 618 within the shopping section 302 or the customer can pass the non-fungible goods through 408 to the delivery fulfillment section 308 for weight, verification, and consolidation with an automated fulfillment order from the automated fulfillment section 304. In this case, the combined order will be delivered 410 to the customer at the delivery fulfillment section 308.

In an exemplary example, picking random-dollar items are the simplest goods to tally, requiring only that the customer use the shopping terminal to scan the price barcode on the item. (the weight of random-dollar items will either be embedded within the price barcode or derived from the barcoded price based on the known unit price of the item.). To tally and purchase random-weight items, once they have bagged the item units they wish to purchase, customers can perform a simple and intuitive three-step process (in any sequence): (1) the shopping terminal is used to scan an RFID tag located on the item's unit-price sign, which identifies the item, (2) the bag is placed on a conveniently located wireless scale 608, and (3) the shopping terminal is used to scan an RFID tag 609 located on the scale 608, which identifies the scale 608. The system-control software then tallies the item price by reading the item weight from the designated scale 608 and applying the item's unit price. Similarly, to purchase random-count items, customers follow the same three-step process described above for random-weight items, plus a fourth step of either inputting the number of eaches being purchased or confirming the estimated number of eaches the system has calculated by dividing the item weight by an average weight per each for that SKU.

In accordance with an example embodiment of the present invention, non-fungible goods can both be virtually selected by customers to be fulfilled by the automated order fulfillment 106 and/or a third party proxy. To virtually select non-fungible, the customer can utilize a remote online display of the available goods or an in store shopping terminal screen 602. The virtual marketplace display(s) on the screens 602 can provide the customer with a variety of visual and measured information about the goods to be selected. For example, the virtual marketplace display(s) can provide digital images for each unique non-fungible goods with associated measured information. The measured information can include, but is not limited to, a weight, a degree of ripeness (e.g., as determined through a spectrograph), a level of firmness (e.g., as determined through automated tactile sensing), etc. Relying on the visual and measured information, the customer can virtually "hand pick" each unique non-fungible good to be picked for delivery by the automated order fulfilment 106.

In accordance with an example embodiment of the present invention, the automated fulfillment section 304 includes inventory of fungible goods for picking by automated fulfillment robots 226. In particular, the automated fulfillment section 304 includes storage racks 612 of inventory in which robots 226 navigate to pull goods to be picked to fulfill orders placed by customers. For example, the automated fulfillment section 304 includes the system described in the examples of such configurations disclosed in U.S. Pat. No. 9,139,363, U.S. Patent Application Publication No. 2014/0288696 U.S. patent application Ser. No. 15/171,802. As would be appreciated by one skilled in the art, any combination of automated inventory management system can be utilized within the automated fulfillment section 304 without departing from the scope of the present invention. Additionally, the automated fulfillment section 304 can also include varied temperature zones for storing goods with different temperature requirements. For example, the automated fulfillment section 304 can include three main temperature zones for ambient temperature, chilled, and frozen goods. As would be appreciated by one skilled in the art, within the chilled zone, there may be additional sub-zones for optimal storage of meats, dairy, and various types of produce.

In accordance with an example embodiment of the present invention, the automated fulfillment section 304 includes a manual-pick area for fungible goods that are not capable of or not ideal to be handled by the automated robots 226 (e.g., uglies), automated tote-consolidation stations, and decanting stations (if this function is performed in the store). In the example automated robot picking design, picking stock is stored in containers called "totes" and while the vast majority of goods can be contained in totes, a few goods are too large in at least one dimension (e.g. brooms, mops, large bags of pet food or cat litter, etc.), and so must be picked manually. In addition, it may be more cost-efficient to pick some high-volume/high-cube goods manually than with automated robots 226 (e.g. bulky paper products, bulk bottled water, etc.), even though dimensionally a tote could hold some small number of eaches of those goods. Instead of being picked by robots 226, all uglies type goods are picked manually, are stored temporarily in a "special-items" holding area, and then delivered by store associates to customers at order-transfer stations 610. Additionally, the automated fulfillment section 304 also includes intermediate storage for completed orders pending delivery to customers.

In operation, the automated order fulfillment 106 fulfills all customer orders for fungible goods. The goods in the order to be fulfilled are provided by the order processing 102 and can include an order of selected fungible goods except for the uglies, and optionally orders for non-fungible goods that have been "pre-packed" in a barcoded package and inducted into the automated order fulfillment 106 system (e.g., cuts of meat). The robots 226 within the automated fulfillment section 304 are responsible for pulling totes eaches from inventory to be provided for picking by human or robotic operator ("pickers") at picking workstations 614. Ordered eaches are packed into "bags" contained within order-totes ("O-totes") by the pickers at the picking workstations 614.

Figure 7:
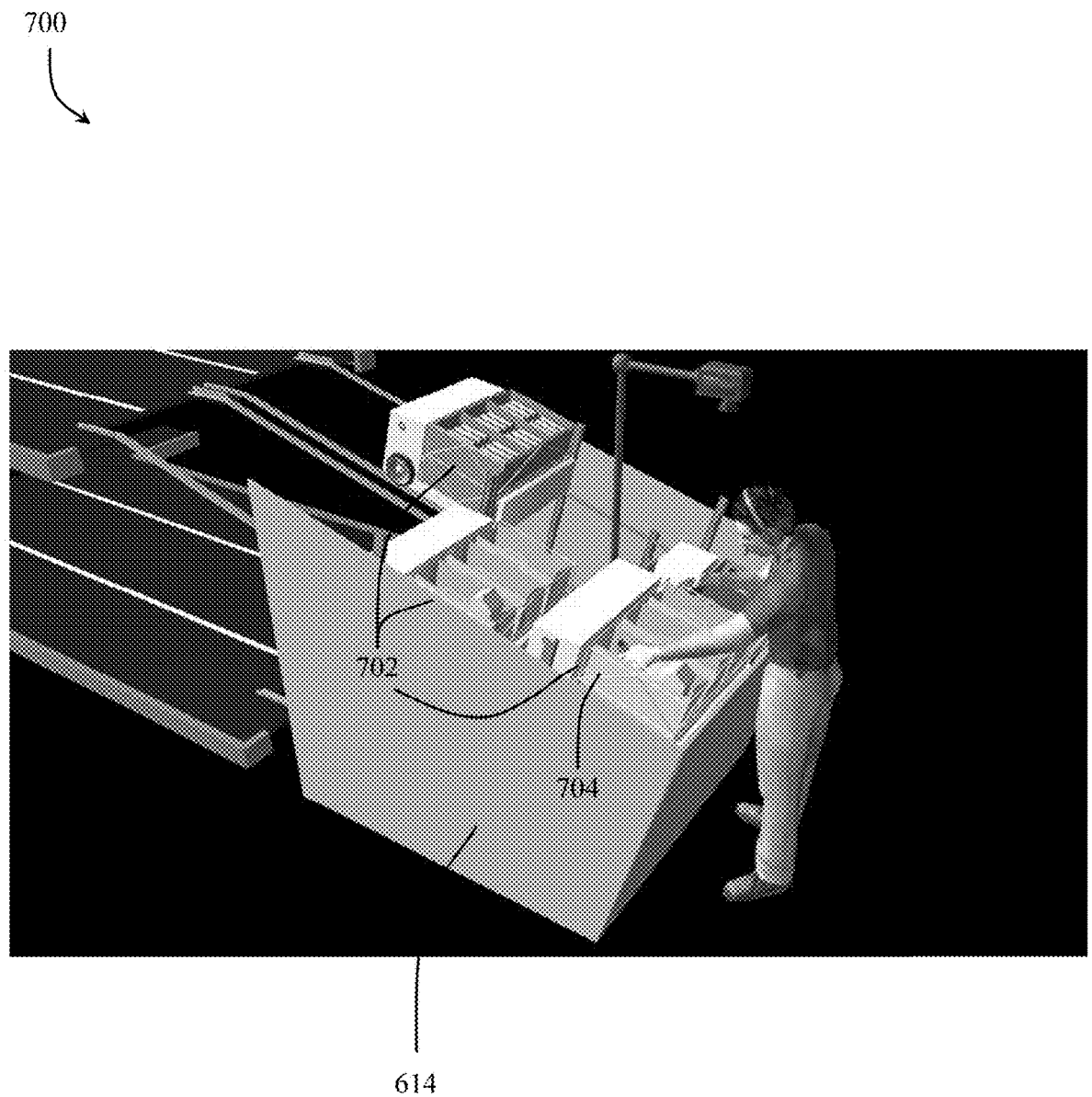
FIG. 7 is an order tote including shopping bags for use in accordance with the aspects of the invention.

FIG. 7 depicts example O-totes 702 includes a plurality of shopping bags 704 includes therein. A typical O-tote 702 serves the same function as the paper and plastic bags used in traditional self-service stores. In accordance with an example embodiment of the present invention, the O-totes 702 have a capacity of up to three traditional paper or plastic shopping bags 704. The design of the bags 704 allows for automated insertion into and manual removal from and O-totes 702. As would be appreciated by one skilled in the art, the customer can provide their own personal bag to be utilized within the system without departing from the scope of the present invention. For example, upon completion of an order selection, the customer can provide a bag to a picker to be placed in the O-tote 702 for the customer's order.

Once an automated order has been completed (e.g., all eaches from an order picked into one or more O-totes 702 at a picking workstation 614), the filled O-totes 702 are either placed into a storage rack 612 subsystem for temporary storage pending delivery to the customer (e.g. if the order was placed online), or discharged from the system immediately for delivery to the customer within the store 300 at the delivery fulfillment section 308 (e.g. if the order was placed in the store). O-totes 702 are placed into storage regardless of the order type and are held until a customer is available to pick-up the order. The automated order fulfillment 106 can store O-totes 702 in the appropriate temperature storage environment. For example, frozen or refrigerated goods will be designated to be stored in a freezer or refrigerator environment while fungible goods can be stored at an ambient temperature of the store 300. Additionally, the stored goods of an order can contain fungible items, or perhaps even special order prepared (e.g., cooked, decorated cake) that can be all picked up together. In particular, when a customer is ready to pick-up an order, all of the O-totes 702 and other products are delivered from the various storage environments to the customer at a designated delivery area.

Additionally, orders may be distributed across multiple O-totes 702. For example, large orders that require more than three traditional bags 704 will be spread across at least two O-totes 702, and orders that include eaches from multiple temperature zones and require intermediate storage before delivery to the customer will require at least one O-tote 702 for each zone. As would be appreciated by one skilled in the art, with orders that are placed in-store for immediate delivery without intermediate storage, eaches of goods from multiple temperature zones can generally be combined into a single O-tote 702, in the same way that such eaches are bagged together during checkout in a traditional self-service store. Counterintuitively, it is usually more capital efficient for O-totes 702 to contain eaches from only a single order. While multi-order O-totes 702 would enable a somewhat greater density in the intermediate storage of online orders, the resulting capex savings will typically be offset by the need for additional bots to perform an order-consolidation process prior to shipping most orders. Order consolidation would also degrade service level by delaying delivery of the order to the customer.

In the automated-service model 100 of the present invention, the checkout process is simply the termination of the shopping process and payment for the goods within the order. The customers can checkout using the shopping terminal or at a checkout kiosk 618 with each payment system having certain restrictions. For example, a checkout kiosk 618 is available for customers paying with cash, by inserting a physical payment card, or if they wish to redeem paper coupons. A shopping terminal is available to customers designating a pre-registered credit/debit card or other form of payment (e.g., using a smart phone via NFC communication with the shopping terminal) associated with the customer. While the simplified checkout transactions will primarily be completed purely electronically via the shopping terminals, the checkout kiosks 618 are available to customers if physical objects are required as part of the checkout process (e.g., cash, credit cards, coupons, etc.). As would be appreciated by one skilled in the art, each checkout kiosk 618 includes a cash-handling mechanism, a debit/credit card reader, a paper-coupon hander, a receipt printer, and a user interface that could be as simple as a touch-screen display (similar to a traditional self-checkout terminal). In operation, each checkout kiosk 618 is configured with an RFID tag reader that enables a customer to read RFID tag information (e.g., order summary) into the shopping terminal to initiate the checkout process. Additionally, for customers utilizing the electronic shopping terminal checkout, a separate bank of receipt printers are available for printing a receipt for the electronically paid order. On each printer is an RFID tag that a customer would read into the shopping terminal in order to initiate printing of the receipt.

In accordance with an example embodiment of the present invention, the customers pay before receiving the goods provided by the automated order fulfillment 106. Once paid, the goods are provided to the customer after exiting the store at a designated order-transfer station 610 (e.g., at the delivery fulfillment section 308). Similarly, the customer can pay for and validate non-fungible order goods that were picked by the customer in the shopping section 302. As discussed herein, the customer tallied each item picked and inserted into their cart, including a product selection (e.g., manually entered, scanned, etc.) and weight (e.g., provided by the wireless scales 608) and a cost is automatically associated with each tallied item in the order. The system 200 can verify a final order of customer picked items by a weight to confirm that the checkout weight of the non-fungible produce matches the total of the tallied weights entered by the customer during shopping. Once the weight is verified, the total cost of the customer's order, including any automated fulfilled orders, can be tallied and applied to the balance for payment.

In accordance with an example embodiment of the present invention, the customers are required to transfer totes including their hand-picked non-fungible goods orders from the shopping section 302 to the delivery fulfillment section 308 (e.g., through 408). At the delivery fulfillment section 308, the tote including the non-fungible goods received from the customer will be consolidated and combined with the O-totes 702 deliver from the automated fulfillment section 304. In particular, the robots 226 deliver totes from the shopping section 302 and the automated fulfillment section 304 to a combination station at the delivery fulfillment section 308 for consolidation prior to delivery to the customer. The delivery fulfillment section 308 includes a merge module that combines the one or more fungible goods from the automated fulfillment section 304 with the one or more non-fungible-goods picked from the shopping section 302 into a delivery bundle. Once all the goods have been combined/consolidated the totes are ready for delivery at an order transfer station 610. The delivery bundle is transported to the pickup station, which receives and stores the delivery bundle in an assigned location until the customers arrive to take delivery of the delivery bundle. As would be appreciated by one skilled in the art, if the customer has selected non-fungible goods only, then there is no need to consolidate the customer's non-fungible goods with an automated order and the customer can exit the store 300 with the non-fungible products after validating the non-fungible goods at a checkout kiosk 618. Accordingly, non-fungible goods only orders do not require the customer to transfer the non-fungible goods back to the delivery fulfillment section 308.

In accordance with an example embodiment of the present invention, the customers can place online orders for pickup or delivery without having to step foot inside the store 300. The online order process can include any combination of the ordering methods discussed herein including searching fungible and non-fungible goods and designating which goods the customer would like to order. Additionally, as discussed herein, customers can virtually hand pick non-fungible goods utilizing the combination of methods and systems discussed herein. Alternatively, the customer can elect to have a proxy picker (e.g., a store employee) pick the non-fungible goods according to the customer's preferences. In this example, the customer can provide instructions for the proxy picker specifying various qualities of the non-fungible goods that they desire (e.g., color, firmness, weight, etc.). The proxy picker will pick the non-fungible goods according to the customer's instructions and add those goods to the automated fulfilled order provide by the automated order fulfillment 106.

In addition to the goods being ordered, the customer specifies a pickup or delivery methods for the order. For example, the customer can specific a scheduled pickup or a scheduled delivery. Additionally, the store 300 can utilize a combination of delivery options including but not limited to a store run delivery fleet or coordinating with a third party service to deliver the goods (e.g., taxi or private car service). The system 200 can provide the customer with multiple pickup and delivery options as well as estimated time of fulfillment for the pickup and delivery options. As would be appreciated by one skilled in the art, the estimated times will vary depending on the type of goods (e.g., non-fungible or fungible), the types of picking process (e.g., automated fulfillment, proxy fulfillment, etc.), a time of day (e.g., peak or off peak shopping periods), the type of delivery method, etc. For automated fulfilled orders only, the time of fulfillment can be realized in as little as ten minutes, based on a number of robots 226 available in the automated fulfillment section 304, providing near on demand latency.

In accordance with an example embodiment of the present invention, the order processing 102, automated order fulfillment 106, and delivery fulfillment 108 can be optimized based on a combination of customer schedules and locations. In particular, the system 200 optimizes customer delivery fulfillment 108 of the order tote fulfillment queue based on delivery/arrival times an. The system 200, can use global positioning system (GPS) information of consumers to manage when the robots 226 pulling orders as well as scheduling a lane to receive delivery of the order for order management and traffic management. For example, the system 200 can prioritize order fulfillment from highest to lowest with the highest prioritization for in store customers, then customers located within a nearby location of the store 300 for pickup, then scheduled home delivery, etc. Similarly, the system 200 can determine when a customer in headed to the store to pick up an order (e.g., based on location information from a customer application) and initiate a dispatch of the customer's order tote(s) to a designated customer pick up location. Additionally, the system 200 can track historical customer behaviors when determining which customer order to prioritize. For example, if a customer frequently changes an order fulfillment time, then the system 200 will give that customer a lower priority to a customer who consistently picks up their order on time. Additionally, the system 200 can offer incentives to customers to accept off-peak delivery/pickup times. The implementation of providing incentives to customers for accepting off peak pickup/delivery will smooth out peaks for optimization.

In accordance with an example embodiment of the present invention, the prioritization tasks will vary based on the "needs" of the store through robot 226 load balancing. As the robots 226 perform order delivery fulfillment 108 and inventory replenishment, the system 200 is scheduled to balance the robot 226 utilization. For example, to system can load balance the robots 226 to perform inventory replenishment during off-peak customer time periods. Also the system 200 can schedule order fulfillment for online orders for next day pickup during night hours when the store 300 is closed to customers. During periods of peak throughput, it is very important to distribute bot workload such that efficient utilization of the robot 226 capacity is maximize in order to satisfy demand and deliver satisfactory service levels to customers. Accordingly, in accordance with an example embodiment, the robots 226 tasks receive the follows prioritization of importance (from highest to lowest priority): deliveries of orders to transfer stations 610, emergency replenishments of picking stocks, picking orders placed by in-store customers, picking orders placed online (further prioritized by scheduled or expected time of pickup), routine replenishment of picking stock.

The final step in the order-fulfillment process in the automated-service model 100 is the transfer of the ordered eaches to the customer (or a delivery proxy) at the delivery fulfillment section 308. In accordance with an example embodiment of the present invention, the delivery fulfillment 108 is responsible for scheduling when the orders are delivered to the respective order-transfer stations 610 within the delivery fulfillment section 308. Delivery fulfillment 108 takes place at designated transfer stations 610 inside (e.g., within the shopping section 302) and/or outside the store 300 at the delivery fulfillment section 308. The eaches picked by the robots 226 are contained in bags 704 inside O-totes 702, and these O-totes 702 are delivered to the transfer stations 610 by the robots 226. Additionally, the manually picked uglies can also be delivered to the same transfer stations 610 by a store associate or picked up by the customer at a dedicated pickup location.

Figure 8:
FIG. 8 is an illustrative example of a delivery method in accordance with the aspects of the invention.

In accordance with an example embodiment of the present invention, the order-transfer stations 610 are structures with a set of shelves that hold O-totes 702. FIG. 8 depicts an example order-transfer station 610 outside of the store within a delivery fulfillment section 308. The shelves of the order-transfer station 610 are accessible from one side (e.g., from the automated fulfillment section 304) by the robots 226, which place the O-totes 702 containing an order on the shelves; those totes are then accessible from a different side to customers (e.g., from the shopping section 302), who remove the bags containing their ordered eaches from the O-totes and place them either into carts or directly into their cars (if the order-transfer stations 610 are outside of the store 300). For orders distributed across multiple O-totes 702, due to the size of the order and/or to the need to store separate portions of the order in different temperature zones, multiple bot trips will typically be required to load a single order onto the shelves of a transfer station 610. Accordingly, the transfer stations 610 must have the capacity to store at least three, and preferably four, O-totes 702 for a designated customer pickup area.

In accordance with an example embodiment of the present invention, the store 300 includes two sets of order-transfer stations 610. In particular, the store 300 includes one set of order-transfer stations 610 to be used by in-store customers and the second set of order-transfer stations 610 to be used by customers that are visiting the store only to pick up their orders and do not go inside the store 300 (e.g., outside order-transfer stations 610). The transfer stations 610 used by in-store customers further include a parking platform for a shopping cart, which can optionally be instrumented to weigh each cart placed on it for checkout, as discussed in greater detail herein. Depending on specific site attributes and store 300 configuration, it is also possible for exterior transfer stations 610 to be used by both in-store and pickup-only customers. For example, the outside order-transfer stations 610 will be installed within the parking lot or parking structure to enable the robots 226 to deliver orders directly to transfer stations 610 located at customers' parked cars.

In accordance with an example embodiment of the present invention, the order-transfer stations 610 can operate bi-directionally, i.e. it is possible for a customer to place the bags containing his/her self-selected non-fungible-goods into an empty O-tote 702 on the shelf of a transfer station 610 so that a robot 226 can place it into (chilled) storage within the robot system. This capability enables in-store customers to leave an order at the store temporarily and pick it up or have it delivered to home at a later time. Similarly, returns can be provided by inserting a returned item into an O-tote 702 during a return transaction. For example, the returned item(s) will go alone in an empty tote, the tote will be returned to a picking work station 614 while simultaneously bringing out product containers from inventory and picking from return container to the product container.

In accordance with an example embodiment of the present invention, the robots 226, can place the completed O-totes 702 containing an order into delivery carts. The delivery carts can be transported to a customer's car or a customer can pick-up a cart at the order-transfer stations 610 and bring the cart to their car themselves.

Figure 9:
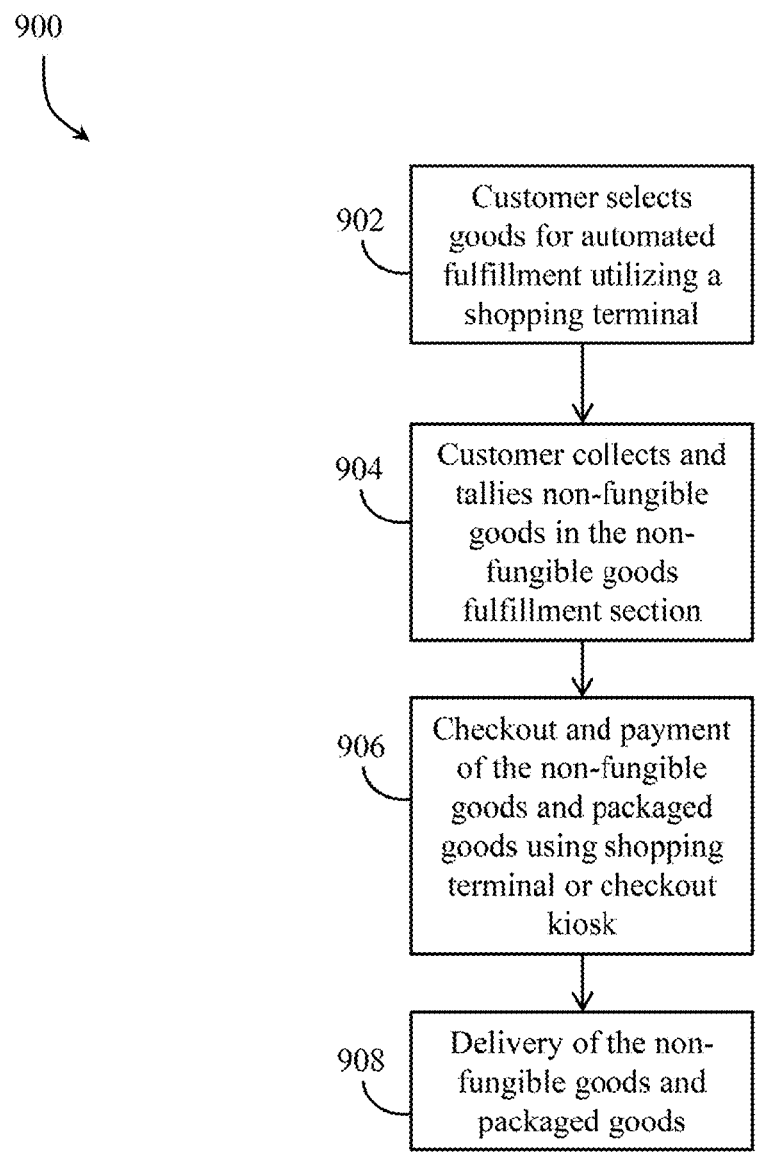
FIG. 9 is an illustrative flowchart depicting operation of the model, in accordance with aspects of the invention.

FIG. 9 shows an exemplary flow chart depicting an implementation of the present invention. Specifically, FIG. 9 depicts an exemplary flow chart showing the operation of the automated service model 100 implemented within the store 300, as discussed with respect to FIGS. 1-8. In particular, FIG. 9 depicts a process 900 for a customer to order goods at a store 300 implementing the automated service model 100 for in-store shopping. At step 902, the customer arrives at the store and selects goods for automated fulfillment utilizing a shopping terminal. As discussed herein, the customer can utilize a portable shopping terminal to scan items or a virtual screen shopping terminal to browse and select item.

At step 904, the customer collects and tallies non-fungible goods in the shopping section 302, if any. As discussed herein, the customer can hand pick non-fungible produce and tally/weigh the produce to be added to the customer order via the shopping terminal(s). The system incentivizes customers to order fungible goods initially (automated fulfillment) by having the automated fulfilled order ready for delivery when the customer is done picking non-fungible goods in the shopping section 302. Shopping for non-fungible goods can include utilizing a cart or tote to select loose produce (random weight), pre-packed (random dollar), and goods from service counters.

At step 906, the customer can perform checkout. In particular, as discussed herein, the customer can utilize the portable shopping terminal or checkout kiosk 618 to check out the combination of the non-fungible goods and the fungible goods. During the checkout, the weight of any tallied non-fungible goods are tallied and verified against the user input and the goods in the automated order are confirmed by the customer. The customer can pay utilizing any combination of cash, credit, virtual payment, etc.

At step 908, the customer receives delivery of the order. The delivery fulfillment provided to the customer includes both the non-fungible goods picked and verified by the customer and the fungible goods picked by the automated order fulfillment 106. As discussed herein, the delivery can take place in the store or outside of the store at the customer's car. Optionally, the customer can select a delayed checkout and leave the completed and paid for order at the store for future pickup or delivery. Checkout on a portable shopping terminal or checkout kiosk 618.

Figure 10:
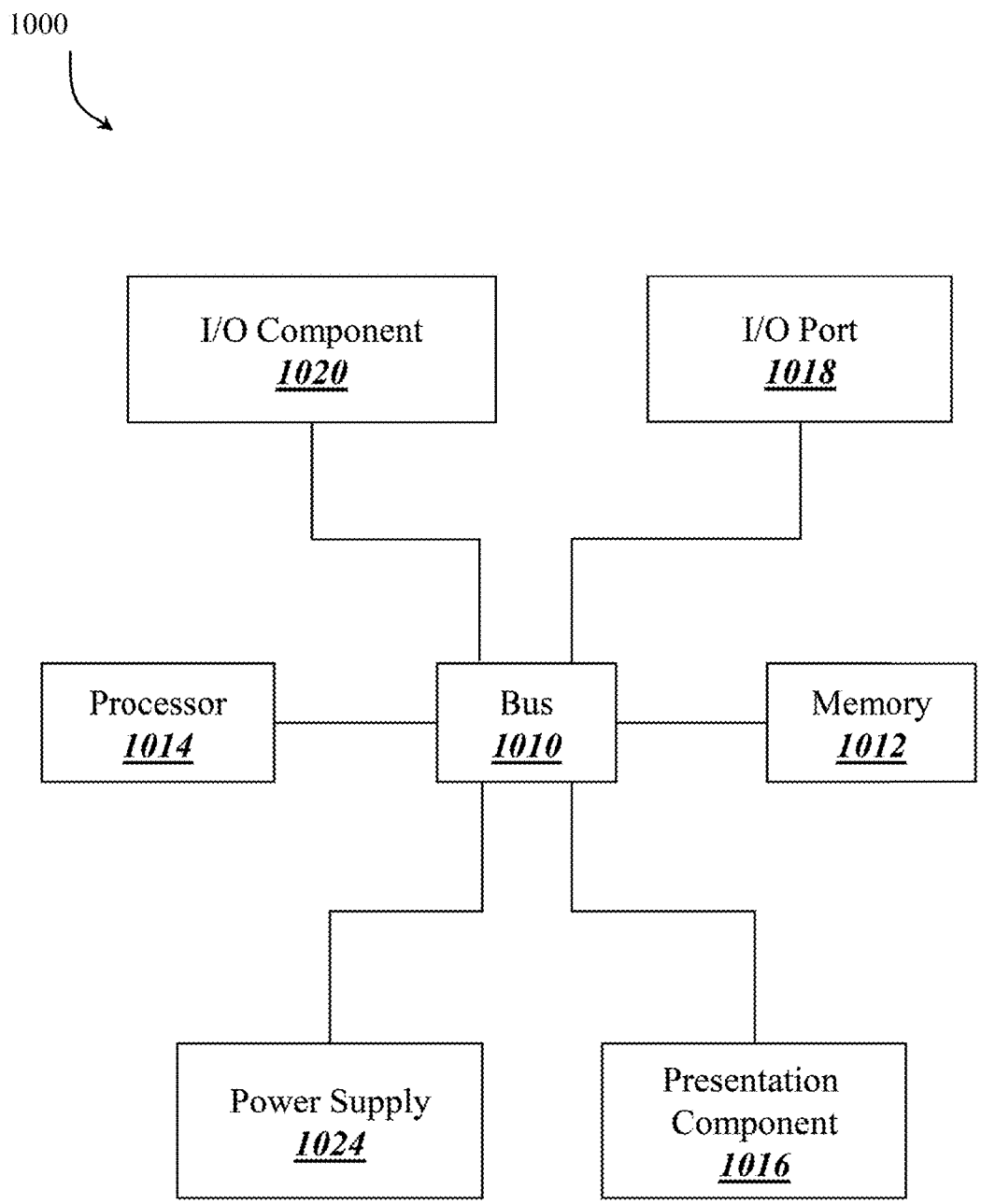
FIG. 10 is a diagrammatic illustration of a high-level architecture for implementing processes in accordance with aspects of the invention.

Any suitable computing device can be used to implement the computing devices 202, 204, 222, 224 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 10. The computing device 1000 is merely an illustrative example of a suitable computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. For example, the memory 1012 may be cloud based data storage accessible by the automated service system 202. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

The invention claimed is:

1. A combination store, comprising:
an automated fulfillment system at a level of the combination store, the automated fulfillment system configured to receive an order of one or more goods selected by a customer or customer proxy, the automated fulfillment system comprising:
a storage structure comprising a plurality of rack structures separated by aisles and having a plurality of storage levels, the storage structure configured to store a plurality of totes; and
at least one mobile robot configured to store and retrieve totes from the storage structure, wherein the at least one mobile robot picks one or more totes with the one or more goods for delivery to a pickup station of the combination store for pickup by the customer or customer proxy; and
a shopping section at another level of the combination store above or below the level having the automated fulfillment system, wherein the shopping section presents additional goods to the customer or customer proxy for picking for purchase.

2. The combination store of claim 1, wherein the automated fulfillment system stores totes containing fungible goods and the additional goods in the shopping section comprise non-fungible goods.

3. The combination store of claim 1, wherein the shopping section includes storage containers for containing the additional goods.

4. The combination store of claim 1, wherein the shopping section further comprises physical displays of the one or more goods stored in the automated fulfillment system that include scannable codes.

5. The combination store of claim 1, wherein the shopping section comprises one or more of a shopping carts, shopping totes, hand-held shopping terminals, or checkout kiosks.

6. The combination store of claim 1, wherein the shopping section includes one or more screens for displaying images of goods stored in the automated fulfillment system.

7. The combination store of claim 1, wherein a mobile robot propels itself horizontally and vertically throughout the storage structure, placing totes into the storage structure, removing totes from the storage structure, and transporting totes.

8. The combination store of claim 1, wherein the automated fulfillment system includes temperature zones for storing goods with different temperature requirements.

9. The combination store of claim 1, wherein the shopping section is on a ground level of the combination store and the automated fulfillment system is above the shopping section.

10. The combination store of claim 1, wherein the automated fulfillment system is on a ground level of the combination store and the shopping section is above the automated fulfillment system.

11. The combination store of claim 1, wherein the shopping section includes one or more terminals for receiving customer selection of goods stored in the automated fulfillment system to add to the order.

12. The combination store of claim 11, wherein the one or more terminals comprises a portable scanning device or fixed touch screens.

13. The combination store of claim 11, wherein the one or more terminals are configured to communicate the selection of goods to add to the order to the automated fulfillment system.

14. The combination store of claim 11, wherein the one or more terminals includes payment kiosks configured to receive payment for the goods added to the order.

15. The combination store of claim 1, further comprising a drop-off station configured to receive goods picked by the customer or customer proxy from the shopping section.

16. The combination store of claim 15, wherein:
the drop-off station comprises an assessment tool configured to identify the goods picked by the customer or customer proxy;
the assessment tool comprises a scale for determining weight; and
the assessment tool comprises an optical scanner for reading images, labels or codes.

17. The combination store of claim 15, wherein the automated fulfillment system is configured to consolidate goods from picked from the automated fulfillment system with goods received at the drop-off station to form a delivery bundle and deliver the delivery bundle to the pickup station for pick up.

18. The combination store of claim 15, wherein the drop-off station is in the shopping section.

* * * * *